US008671141B2

(12) United States Patent
Serafini et al.

(10) Patent No.: US 8,671,141 B2
(45) Date of Patent: Mar. 11, 2014

(54) SOCIAL NETWORKING FEED DELIVERY SYSTEM AND METHOD

(75) Inventors: Marco Serafini, Barcelona (ES); Aristides Gionis, Barcelona (ES); Ingmar Weber, Barcelona (ES); Flavio Junqueira, Barcelona (ES)

(73) Assignee: Yahoo! Inc., Sunnyvale, CA (US)

( * ) Notice: Subject to any disclaimer, the term of this patent is extended or adjusted under 35 U.S.C. 154(b) by 59 days.

(21) Appl. No.: 13/539,949

(22) Filed: Jul. 2, 2012

(65) Prior Publication Data
US 2014/0006503 A1 Jan. 2, 2014

(51) Int. Cl.
*G06F 15/16* (2006.01)

(52) U.S. Cl.
USPC .............................. 709/204; 709/203; 709/246

(58) Field of Classification Search
USPC .......... 709/203, 204, 205, 219, 223, 224, 246
See application file for complete search history.

(56) References Cited

U.S. PATENT DOCUMENTS

| 8,302,164 | B2 * | 10/2012 | Lunt | 726/4 |
|---|---|---|---|---|
| 2006/0123127 | A1 * | 6/2006 | Littlefield | 709/229 |
| 2010/0312644 | A1 * | 12/2010 | Borgs et al. | 705/14.55 |
| 2012/0278395 | A1 * | 11/2012 | Garcia | 709/205 |
| 2012/0303702 | A1 * | 11/2012 | Richter et al. | 709/204 |
| 2013/0006935 | A1 * | 1/2013 | Grisby | 707/635 |
| 2013/0151456 | A1 * | 6/2013 | Gionis et al. | 706/47 |
| 2013/0275429 | A1 * | 10/2013 | York et al. | 707/737 |

FOREIGN PATENT DOCUMENTS

| JP | 11265369 A | * | 9/1999 |
|---|---|---|---|
| WO | WO 2008060643 A2 | * | 5/2008 |
| WO | WO 2010048172 A1 | * | 4/2010 |

OTHER PUBLICATIONS

Y. Asahiro, K. Iwama, H. Tamaki, and T. Tokuyama. "Greedily finding a dense subgraph"; Journal of Algorithms, 34(2):203-221, 2000.
M. Cha, H, Haddadi, F. Benevenuto, and K. P. Gurnmadi. "Measuring user influence in Twitter: The million follower fallacy"; In Proc. of ICWM, vol. 14, p. 8, 2010.
M. Charikar. "Geedy approximaton algorithms for fnding dense components in a graph", In Proc. of APPROX, pp. 139-152, 2000.
G. Chockler, R. Melamed, Y. Tock, and R. Vitenberg. "Constructing scalable overlays for pub-sub with many topics: Problems, algorithms, and evaluation"; In Proc. of PODC, pp. 109-118, 2007.
V. Chvatal. "A greedy heuristic for the set-covering problem"; Mathematics of Operations Research, 4(3):233-235, 1979.
J. Dean and S. Ghemawat. "Mapreduce: simplified data processing on large clusters"; Communications of the ACM, 51(1):107-113, 2008.
U. Feige. "A threshold of ln n For approximating set cover"; Journal of the ACM, 45(4):634-652, 1998.

(Continued)

*Primary Examiner* — Kostas Katsikis
(74) *Attorney, Agent, or Firm* — James J. DeCarlo; Greenberg Traurig, LLP

(57) ABSTRACT

Disclosed herein are a system, method and architecture for optimizing a manner in which queries and updates are issued to data stores servicing an application such as a social networking application. A social graph modeling a social network may be used to generate a data store request schedule that optimizes, e.g., minimizes, data store accesses, such as without limitation queries and updates to the data store.

30 Claims, 17 Drawing Sheets

(56) References Cited

OTHER PUBLICATIONS

B. A. Huberman, D. M. Romero, and F. Wu. Social networks that matter: Twitter under the microscope. First Monday, 14(1-5), 2009.

J. Leskovec and C. Faloutsos. "Sampling from large graphs"; In Proc. of KDD, pp. 631-636, 2006.

M. E. Newman. "The structure and function of complex networks"; SIAM review, 45(2):167-256, 2003.

A. Silberstein, J. Terrace, B. F. Cooper, and R. Ramakrishnan. "Feeding frenzy: selectively materializing users' event feeds"; In of SIGMOD, pp. 831-842, 2010.

Gionis, et al. "Piggybacking on Social Networks" The 39th International Conference on Very Large Data Bases, Aug. 26-30, 2013, Riva del Garda, Trento, Italy. Proceedings of the VLDB Endowment, vol. 6, No. 6 Copyright 20132, 2010.

Saab; "Scaling memcached at facebook" http://www.facebook.com/note.php?note id=39391378919.; 4 pages Dec. 12, 2008.

Tumblr architecture—15 billion page views a month and harder to scale than twitter. http://highscalability.com/blog/2012/2/13/tumblr-architecture-15-billion-page-views-a-month-and-harder.html, 16 pages; Feb. 13, 2012.

P. T. Eugster, P, A. Felber, et al. "The many faces of publish/subscribe" CSUR, 35, Jun. 2, 2003; 18 pages.

A. Halevy. Answering queries using views: A survey. The VLDB Journal, 10, 2001; 25 pages.

D. Karger, E. Lehman, et al. "Consistent hashing and random trees: distributed caching protocols for relieving hot spots on the world wide web"; In STOC,1997; 10 pages.

J. Pujol, V. Erramilli, et al. The little engine(s) that could: Scaling online social networks. CCR, 40(4), 2010; 12 pages; SIGCOMM'10, Aug. 30-Sep. 3, 2010, New Delhi, India.

* cited by examiner

Algorithm 1 CHITCHAT
Input: Directed graph $G = (V, E)$;
Output: Dissemination schedule $(H, L)$
1: $Z \leftarrow E$;                                           {Uncovered edges}
2: $Q \leftarrow \emptyset$;                                   {A priority queue}
3: $H \leftarrow \emptyset$;                                   {Push edges}
4: $L \leftarrow \emptyset$;                                   {Pull edges}
   {Determine the first DENSESTSUBGRAPH oracle output}
5: for (each $w \in V$) do
6:     Form maximal hub-graph $G(w)$;
       {Find densest subgraph $S$ in $G(w)$ with density $d(S)$}
7:     $(S, d(S)) = $ DensestSubgraph$(G(w), H, L, Z)$;
       {Insert subgraph $S$ in priority queue with cost $\frac{1}{d(S)}$}
8:     Insert$(Q, S, \frac{1}{d(S)})$;
   {Greedy steps for SETCOVER}
9: while $(|Z| > 0)$ do
10:    $S \leftarrow $ ExtractMin$(Q)$;         {Extract min-cost subgraph}
11:    $Z \leftarrow Z \setminus E(S)$;              {Edges $E(S)$ covered}
       {Add $S$ to the solution}
12:    $H \leftarrow H \cup ((S.X) \rightarrow w)$;
13:    $L \leftarrow L \cup (w \rightarrow (S.Y))$;
       {Update the DENSESTSUBGRAPH oracle output}
14:    for (each $G(w)$ that contains edges of $E(S)$) do
15:        Let $S^*$ be the current densest subgraph of $G(w)$;
16:        Remove$(Q, S^*)$;
17:        $(S, d(S)) = $ DensestSubgraph$(G(w), H, L, Z)$;
18:        Insert$(Q, S, \frac{1}{d(S)})$;
19: return $(H, L)$

FIGURE 5

```
Algorithm 2 Nosy
Input: Directed graph G = (V, E);
Output: Dissemination schedule (H, L);
 1: H ← ∅;                                              {Push edges}
 2: L ← ∅;                                              {Pull edges}
 3: C ← ∅;                              {Edges covered via some hub}
    {Select hub-graphs}
 4: for (each y ∈ V) do
 5:    for (each w ∈ V s.t. (w → y) ∈ E \ C) do
 6:       X ← {x | (x → w) ∈ E \ C ∧ (x → y) ∈ (E \ (C ∪ H ∪ L))};
 7:       if p(X, w, Y) − c(X, w, Y) > 0 then
 8:          H ← H ∪ E(X, w);
 9:          L ← L ∪ {w → y};
10:          C ← C ∪ E(X, y);
    {Extend selected hub-graphs}
11: for (each y ∈ V) do
12:    for (each w ∈ V s.t. (w → y) ∈ E) do
13:       X_y ← {x | (x → w) ∈ H ∧ (x → y) ∈ (E \ (C ∪ H ∪ L))};
14:       if p(X_y, w, {y}) − c_Y(w → y) > 0 then
15:          L ← L ∪ {w → y};
16:          C ← C ∪ E(X_y, y);
    {Cover directly the edges that are still uncovered}
17: for (each (u → v) ∈ E \ (C ∪ H ∪ L)) do
18:    if r_p(u) < r_c(v) then
19:       H ← H ∪ {(u → v)}
20:    else
21:       L ← L ∪ {(u → v)}
22: return (H, L)
```

FIGURE 8

SOCIAL NETWORKING FEED DELIVERY SYSTEM AND METHOD

FIELD OF THE DISCLOSURE

The present disclosure relates to social networking feed delivery, and more particularly relates to selecting a user's view to be a hub for other users' views.

BACKGROUND

Social-networking applications such as Facebook™ and Twitter™ generate communication-intensive workloads. They provide users with highly dynamic and personalized content about the activities, or events, of their friends, for example. These personalized feeds often present near real-time information to increase user engagement. In order to build near real-time personalized feeds, events are frequently updated and queried from back-end data stores.

SUMMARY

With social networking applications such as without limitation Facebook™, Twitter™, Yahoo!™ News Activity, etc., users may establish connections with other users and share events, or items of content, such as without limitation short text messages, URLs, pictures, news stories, videos, etc. Users desire to be able to have real-time, or near real-time, event streams containing recent events shared by their contacts. Data stores can be used to store events, which are retrieved to generate a user's event stream. Such data stores may be used to store a view, or materialized view, for a user. A view may comprise events from one or more other users, e.g., the user's contacts or friends, and/or the view may include the user's own events. The data stores are accessed to update each user's view, e.g., a data store may perform one or more write operations in response to a new event, the data store may perform one or more read operations to retrieve events for a user's event stream. It is apparent that data store access to maintain user views may easily become a bottleneck for such an online application. Users and their contacts may form a potentially large social network, with each user having a view that is maintained. Supporting social networking workloads is resource intensive, particularly with regard to the data store(s) servicing the social network. A social networking application may execute queries over a social graph which models a social network making it difficult to partition the workload and assign different partitions to different data store groups.

The present disclosure seeks to address failings in the art and to provide a system, method and architecture for optimizing a manner in which queries and updates are issued to data stores servicing an application such as a social networking application. In so doing, partitioning can be avoided. In accordance with embodiments of the present disclosure, a social graph modeling a social network may be used to generate a data store request schedule that optimizes, e.g., minimizes, data store accesses, such as without limitation queries and updates to the data store.

In accordance with one or more embodiments, a method is provided, which method comprises obtaining, via at least one computing device, a social graph representing a plurality of social network users as a plurality of content consumers and content producers of the social network, each content producer producing, and each content consumer consuming, one or more items of content, the social graph identifying a content sharing relationship for a consumer-producer pair comprising a content consumer and content producer of the plurality of content consumers and content producers, the content sharing relationship representing that the content consumer consumes the one or more content items produced by the content producer; selecting, via the at least one computing device from the plurality of content consumers and content producers, a content sharing hub for at least one consumer-producer pair, the content sharing hub having a content sharing relationship with each of the content consumer and the content producer of the consumer-producer pair; and defining, via the at least one computing device, a new content sharing relationship for the consumer-producer pair using the content sharing hub, the new content sharing relationship representing that the content consumer consumes the one or more content items produced by the content producer via the content sharing hub.

In accordance with one or more embodiments, a system is provided, the system comprising at least one computing device comprising one or more processors to execute and memory to store instructions to obtain a social graph representing a plurality of social network users as a plurality of content consumers and content producers of the social network, each content producer producing, and each content consumer consuming, one or more items of content, the social graph identifying a content sharing relationship for a consumer-producer pair comprising a content consumer and content producer of the plurality of content consumers and content producers, the content sharing relationship representing that the content consumer consumes the one or more content items produced by the content producer; select, from the plurality of content consumers and content producers, a content sharing hub for at least one consumer-producer pair, the content sharing hub having a content sharing relationship with each of the content consumer and the content producer of the consumer-producer pair; and define a new content sharing relationship for the consumer-producer pair using the content sharing hub, the new content sharing relationship representing that the content consumer consumes the one or more content items produced by the content producer via the content sharing hub.

In accordance with one or more embodiments, a non-transitory storage medium is provided, the non-transitory storage medium for tangibly storing thereon computer readable instructions that when executed cause at least one processor to obtain a social graph representing a plurality of social network users as a plurality of content consumers and content producers of the social network, each content producer producing, and each content consumer consuming, one or more items of content, the social graph identifying a content sharing relationship for a consumer-producer pair comprising a content consumer and content producer of the plurality of content consumers and content producers, the content sharing relationship representing that the content consumer consumes the one or more content items produced by the content producer; select, from the plurality of content consumers and content producers, a content sharing hub for at least one consumer-producer pair, the content sharing hub having a content sharing relationship with each of the content consumer and the content producer of the consumer-producer pair; and define a new content sharing relationship for the consumer-producer pair using the content sharing hub, the new content sharing relationship representing that the content consumer consumes the one or more content items produced by the content producer via the content sharing hub.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides an example of a social networking system architecture used in accordance with one or more embodiments of the present disclosure.

FIG. 2 provides an example of a hub in accordance with one or more embodiments of the present disclosure.

FIG. 3 provides an example of data store requests described in connection with one or more embodiments of the present disclosure.

FIG. 4 provides an example of a process flow in accordance with one or more embodiments of the present disclosure.

FIG. 5 provides an example of a greedy algorithm variant for use in accordance with one or more embodiments of the present disclosure.

FIG. 6 provides an example of a hub graph centered in accordance with one or more embodiments of the present disclosure.

FIG. 7, which comprises FIGS. 7A, 7B and 7C, provide a process flow of the greedy algorithm variant for use in accordance with one or more embodiments of the present disclosure.

FIG. 8 provides exemplary pseudocode of a greedy heuristic for use in accordance with one or more embodiments.

FIG. 9, which comprises FIGS. 9A-9E, provides an example of a greedy heuristic process flow in accordance with one or more embodiments.

DETAILED DESCRIPTION

Figure 1:
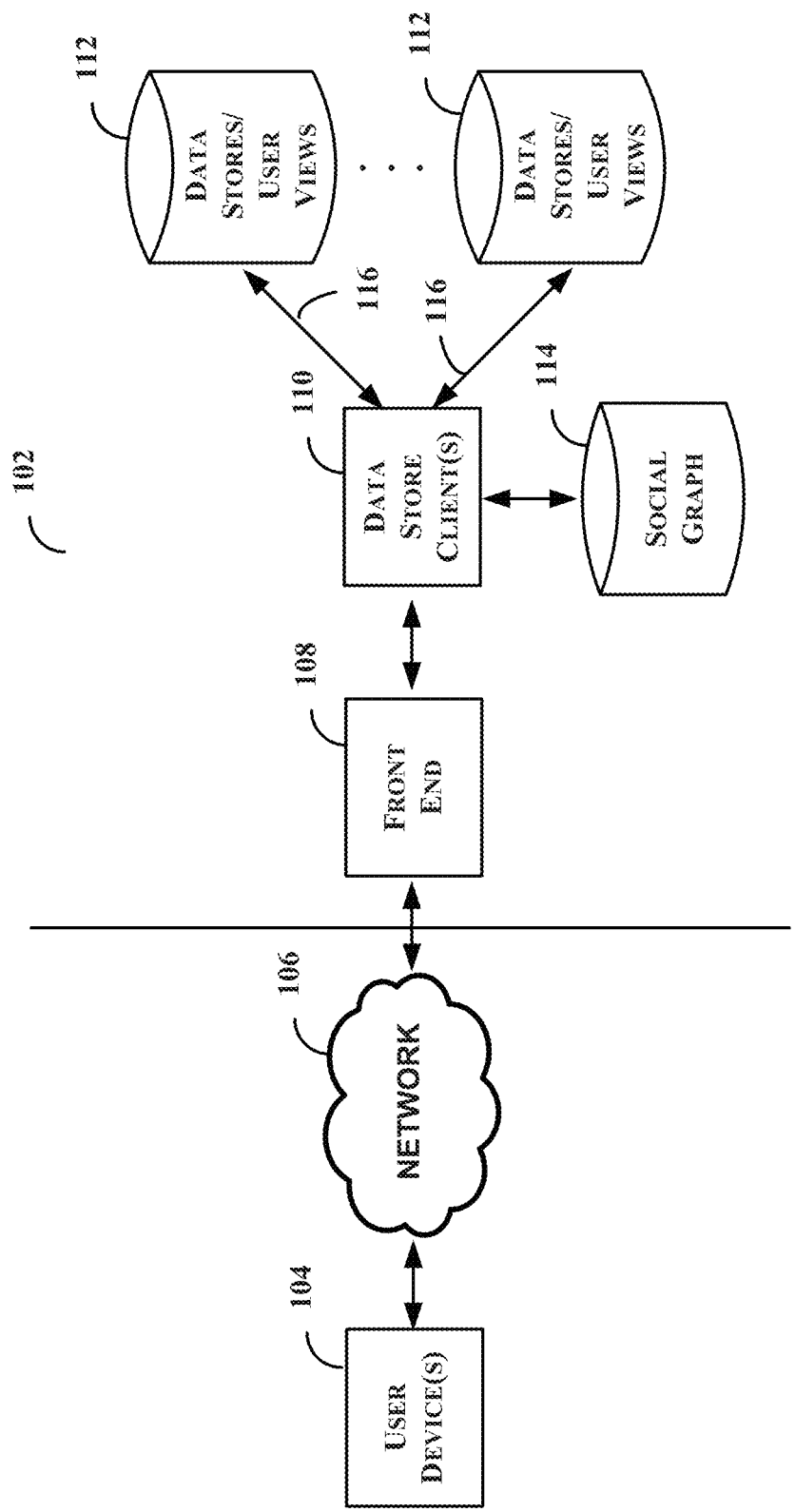

Certain embodiments of the present disclosure will now be discussed with reference to the aforementioned figures, wherein like reference numerals refer to like components.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion.

In general, the present disclosure includes a social network feed delivery system, method and architecture. In accordance with one or more embodiments, a social network application may present users with event streams, each event stream comprising events, or items of content. In so doing, users of a social networking application can share events, also referred to herein as content or items of content. Materialized views, or views, may be used generate such streams. Each user may have its own view.

Access to the data stores storing user views is a major bottleneck of social networking systems. In accordance with one or more embodiments, data store access is optimized, or minimized, thereby improving throughput. In accordance with one or more embodiments, data store requests of two friends are processed by querying and updating the view of a third common friend. The view of the third common friend may be referred to as a hub view. By virtue of this arrangement, requests of one of the two friends may be served without querying or updating the view of the second of the two friends.

Some non-limiting examples of applications that may make use of the network delivery feed system, method and architecture provided in accordance with one or more embodiments of the present disclosure include without limitation social networking applications such as Facebook™, Twitter™, Yahoo!™ News Activity, etc. In such applications, users establish connections with other users and share events, such as without limitation short text messages, URLs, pictures, news stories, videos, etc. Users can see real-time event streams containing recent events shared by their contacts. Users and their contacts form a social graph.

FIG. 1 provides an example of a social networking system architecture used in accordance with one or more embodiments of the present disclosure. In the example, a social networking system 102 may store in data store(s) 112 information about users, such as without limitation individuals, applications, etc. which may access the system 102, a social graph 114, and events or content shared by entities. Users may access system 102 using user device(s) 102, for example, and write a content item, e.g., a tweet, post, blog entry, etc., or read a content item from data store(s) 112. A user may submit a content request to the system 102, e.g., such request may be a request to share a new content item with one or more content consumers or a request by a content consumer to retrieve new content items produced by one or more content producers. By way of a non-limiting example, a user request may be submitted via a browser application executing on a user device 104, transmitted via network 106 to a front end 108, such as a social networking application. The front end 108 may forward the request to a data store client 110, which accesses one or more user views stored by data stores 112. By way of a further non-limiting example, the front end 108 and/or data store client 108 may be implemented by one or more server computers.

An event stream, which may also be referred to herein as a social networking feed, content feed, web feed etc., is a mechanism for delivering items of content between users of the system 102. In a social networking system, such as system 102, event streams may be frequently updated by users of the system. The present disclosure contemplates any applicable event stream and content item. An event stream conceptually connects a content producer and a content consumer at each end. In accordance with one or more embodiments, a content producer, or simply a producer, is an entity that produces an item, or items, of content that may be consumed by one or more other entities, referred to as content consumers, or consumers. A content consumer is an entity that consumes an item, or items, of content produced by one or more content producers. In social networking parlance, it may be said that a consumer "follows" or is a follower of the content produced by one or more producers. An entity may be both a producer and a consumer, as the entity may produce contents for others to consume at one time and consume contents produced by others at another time. Thus, with respect to a feed where an entity produces contents for another, the entity is referred to as the producer; and with respect to another feed where the same entity consumes contents from another, the entity is referred to as the consumer.

A large social network with a very large number of active users may generate a considerable load on data store(s) 112 that respond to content write requests by producers and content read, e.g., query, requests from consumers. By way of a non-limiting example, data stores 114 may be relational databases, key-value stores, or other data stores. To manage the load, materialized views of the data store(s) 112 may be used. A materialized view may be formed for each user on a per-user basis, since each user may, and likely will, have a different social networking feed. A user's view may comprise content items from other content producing users as well as content items produced by the user as a content producer.

Throughput of a social networking system 102 may be proportional to data transferred to and from its data store(s) 112. Data store throughput has a direct impact on an overall throughput of the social networking system 102. Embodiments of the present disclosure optimize data store access and reduce load on data stores, such as data stores 112. By way of some non-limiting examples, the load illustrated by data access arrows 116 may include querying, e.g., by content consumers, and updating, e.g., by content producers, data stores 112. Reducing such reads and writes to the data store(s) 112 results in a reduction of the load on the data store(s) 112.

As a result, throughput for both the data store(s) 112 and the system 102 as a whole is improved. Improving data store throughput results in improved response time, an ability to reduce data stores and/or data store servers needed to service the social networking system 102, for example.

A social networking system 102 may assign views of content producers "followed" by a user and view of content consumers that "follow" the user into either a push set or a pull set. A push set might contain views of content consumers that may be updated by data store client(s) 110 when the user shares a new content item. A pull set might contain views of content producers that may be queried to generate the user's event stream or social networking feed. By way of a non-limiting example, a push strategy may be used to "pre-compute" the user's view, e.g., each new event is "pushed" to the user's view to update the user's view in response to the new event, while a pull strategy may be used to compute the user's view in response to the user's request, e.g., new events are "pulled" from other views in response to a request to update the user's view. To further illustrate, in a push set, a user's view is updated each time a new event occurs from another user. In a pull set, a user's view can be updated in response to a user's request for an updated event stream.

A collection of push and pull sets for each user of system 102 may be referred to as a request schedule. Two examples of request schedules are push-all and pull-all. In a push-all schedule, the push set contains the views of all of the user's producers and consumers and the pull set contains the user's view. In a pull-all schedule, the pull set contains the view of all of the user's producers and consumers and the push set contains the user's view. A push-all schedule may be particularly efficient in a read-dominated workload, e.g., a workload in which queries or read operations predominate, as each read generates only one request to the data store(s) 112. A pull-all schedule may be specular, e.g., a pull request may comprise a read request or query to a number of views, which results in a number of data store requests, and may be better suited for write-dominated workloads. In contrast to a push-all or pull-all schedules, a hybrid request schedule, chooses, for each pair of users, between push and pull depending on how frequently the two users share events and request event streams.

Figure 2:
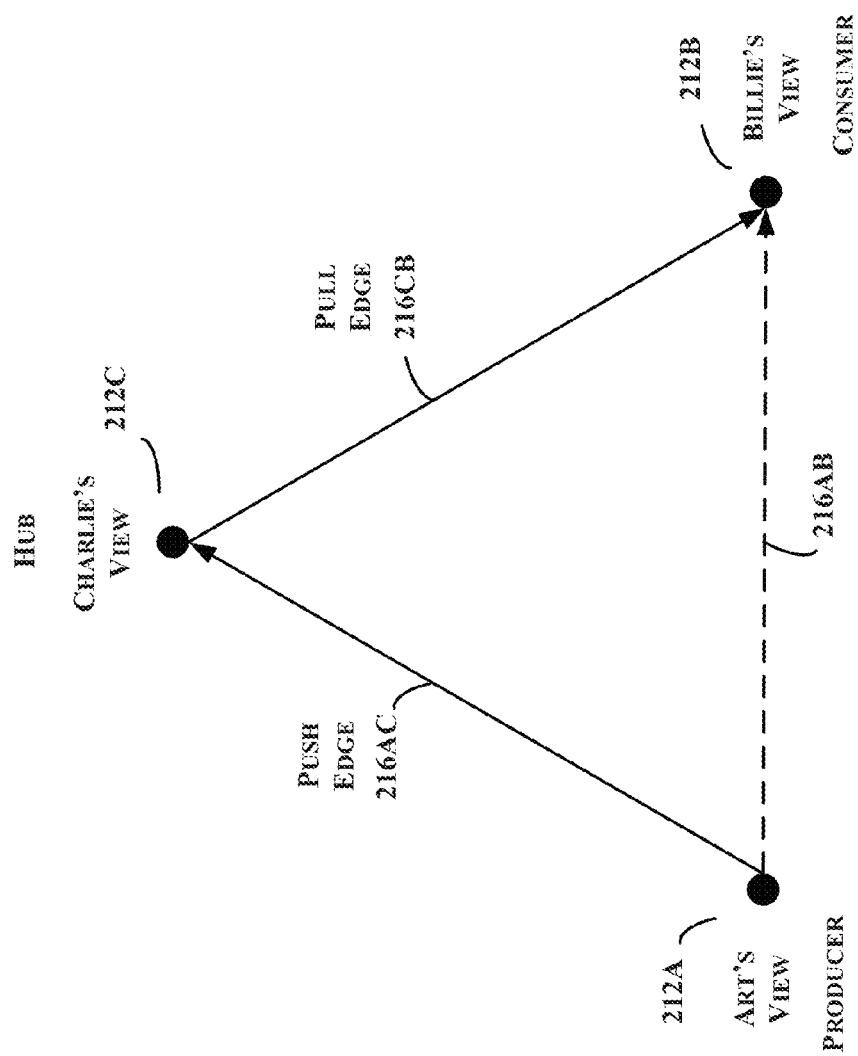

Embodiments of the present disclosure provide improvement over the push-all, pull-all and hybrid request scheduling, and provide a request schedule that uses one or more views, each acting as a hub for other views. FIG. 2 provides an example of a hub in accordance with one or more embodiments of the present disclosure. In the example shown in FIG. 2, Art is a content producer and Billie and Charlie are each a content consumer of Art. Without a view to act as a hub, each edge 216AC, 216AB and 216CB results in either a push or a pull operation requiring access to data store(s) 112. Each edge 216AC, 216AB and 216CB represents a consumer-producer pair, the producer producing one or more items of content and the consumer consuming the one or more items of content. Each item of content produced by the producer may be pushed to the consumer when the producer produces the content, or pulled by the consumer when the consumer requests the item of content, e.g., in a request for a new or updated event stream.

Without a hub, for example, items of content, produced by Art must be pushed, or pulled, to Charlie's view 212C and to Billie's view 212B, as illustrated by edges 216AC and 216AB. Using Charlie's view 212C as a hub, edge 216AB, which would otherwise require a push or a pull operation and data store access, may be eliminated. In accordance with one or more embodiments, a push, or pull, operation represented by edge 216AB may be eliminated from a request schedule by using Charlie's view 212C as a hub view, pushing Art's updates to Charlie's view 212C, as represented by edge 216AC, and updating Billie's view 212B to include Art's updates by pulling from Charlie's view 212C, as represented by edge 216CB. In accordance with such embodiments, using Charlie's view 212C as a hub, Billie's view 212B may be updated with a pull operation, as represented by edge 216CB, and edge 216AC can be eliminated, thereby eliminating data store access associated with edge 216AB.

To illustrate further, in the example shown in FIG. 2, Charlie's view 212C may be in Art's push set, such that updates from Art are pushed to Charlie's view, as illustrated by edge 216AC. In the example, one or more data store clients, such as data store clients 110, may be used to insert each new event, e.g., tweet, generated by Art into Charlie's view 212C. Consider now that Billie follows both Art and Charlie. Where Charlie is not used as a hub, when Billie requests an event stream, one or more data store clients 110 may be used to pull Art's updates from Art's view 212A, as represented by edge 216AB, and Charlie's updates from Charlie's view 212C, as represented by edge 216CB. In contrast and in accordance with one or more embodiments, where Charlie's view 212C is used as a hub, when Billie requests an event stream, one or more data store clients 110 may be used to pull both Art's updates and Charlie's updates from Charlie's view 212C, as represented by edge 216AB; data store requests to Art's view 212A need not be used to retrieve Art's updates. In so doing, edge 216AC may be served through Charlie's view 212C, which acts as a hub, and edges 216AC and 216CB. The approach used in accordance with embodiments of the present disclosure, which may be referred to as social piggybacking, generates fewer data store requests than push-all, pull-all, or hybrid schedules.

Figure 3:
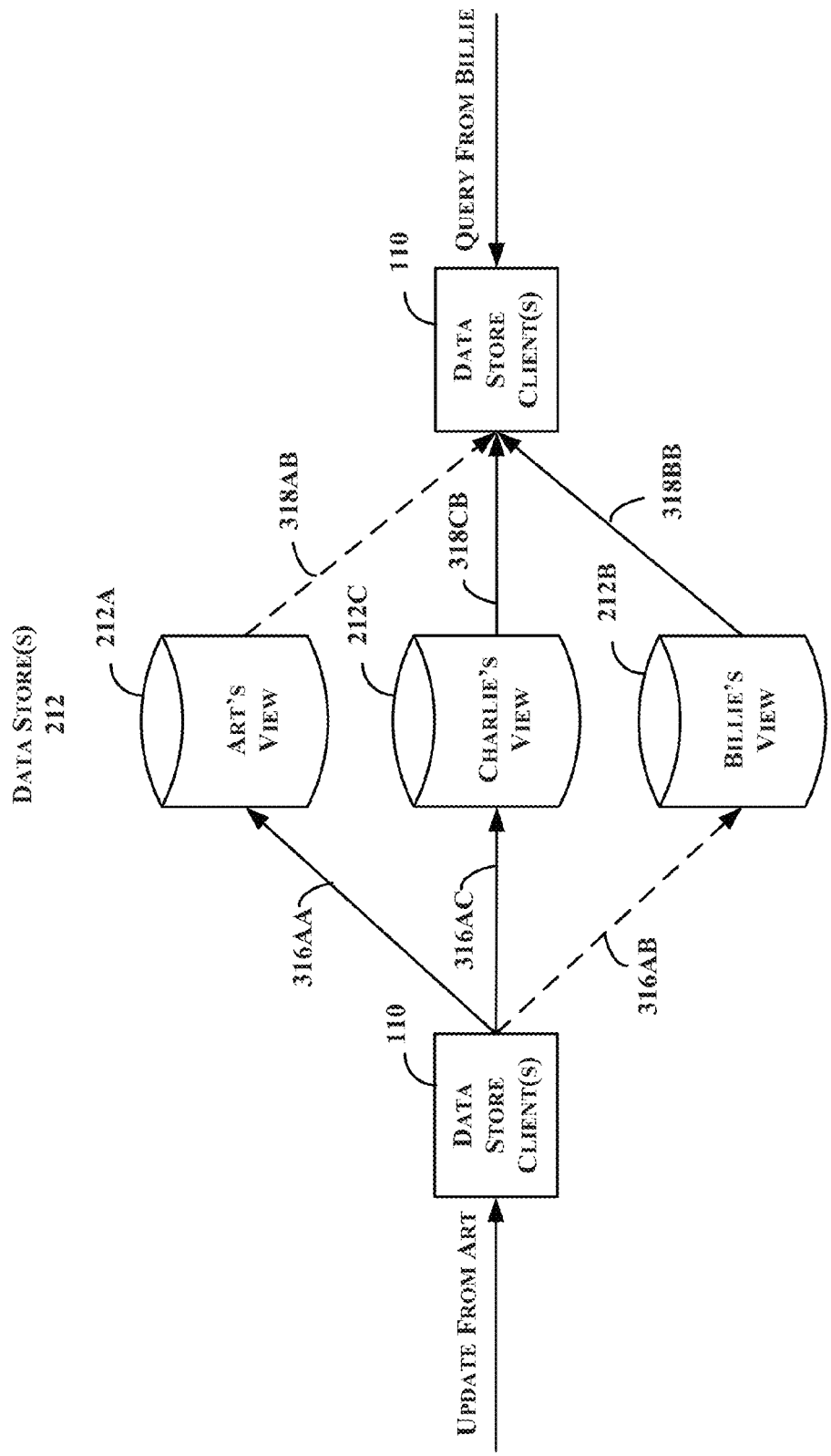

FIG. 3 provides an example of data store requests described in connection with one or more embodiments of the present disclosure. Where a push-all schedule is used, the system pushes new events or updates from Art to Art's view 214A, Billie's view 214B and Charlie's view 214C, as illustrated by edges 316AA, 316AB and 316AC. With a pull-all schedule, the system queries events from Art's view 214A, Billie's view 214B and Charlie's view 214C whenever Billie requests a new event stream, as illustrated by lines 318AB, 318BB and 318CB. With a hybrid schedule, the system executes whichever one of a pull and push operation is determined to be the least costly, where cost may be determined based on a production frequency for the producer and a consumption frequency for the consumer. By way of a non-limiting example, a content producer's production frequency may be based on how frequently the content producer shares new events, or new content, and a content consumer's consumption frequency may be based on how frequently the content consumer makes a request to receive events, or content, produced by content providers. In a hybrid scheduling approach, where Billie queries the data store(s) 212 to retrieve new events or content less frequently than Art writes new events to data store(s) 212, Billie's rate of consumption may be said to be less than Art's rate of production, and a pull operation may be selected as a result. Conversely and in the hybrid scheduling approach, where Billie queries the data store(s) 212 more frequently than Art writes new events to data store(s) 212, Billie's rate of consumption may be said to be greater than, e.g., more costly than, Art's rate of production, and a push operation may be selected as a result.

As discussed above, embodiments of the present disclosure identify a hub and minimize the overall rate of requests sent to data store(s) 212. By way of a non-limiting example, as discussed above, Charlie's view 212C may be used as a hub, thereby eliminating the need for edges 316AB and 318AB. In accordance with one or more embodiments, user views may be used as hubs, and where a hub is unavailable for a pair of user's views, events may be sent to the users' views directly, such as without limitation using a push or pull operation determined in accordance with the users' rates of production and consumption, as in a hybrid scheduling approach.

In accordance with one or more embodiments, a social dissemination problem is formalized as a problem of propagating events on a social graph, which comprises vertices and edges. For the purposes of discussion, vertices, corresponding users and their views are used interchangeably. Where a vertex u pushes events to a vertex v, this corresponds, in a social networking system, such as system 102 of FIG. 1, to data store client(s) 110 updating the view of the user v with all new events shared, or produced, by user u. Similarly, where a vertex v pulls events from a vertex u, this corresponds to data store client(s) 110 sending a query request to the view of the user u in order to generate event stream for v. Events pulled by a vertex v may, but need not be, copied into the view of v. For simplicity, for purposes of discussion, users may access their own view with updates and queries.

In accordance with one or more embodiments, a social graph may be represented as a directed graph G=(V; E). An edge u→v in the social graph indicates that user v subscribes to the events produced by user u. In such a scenario, user u is a producer and user v is a consumer. Where the view of a user v contains an event produced by a different user u, user u subscribes to the events produced by user v, which, as discussed above, may be represented by the edge u→v. Symmetric social relationships, such as being friends on Facebook™, can be modeled with two directed edges u→v and v→u.

In accordance with one or more embodiments, events streams have bounded staleness, such that each event stream generated for a user u contains all recent events shared by producers of u, where recency may be a predetermined time, $\Theta$. By way of some non-limiting examples, a value of $\Theta$ may depend on various system parameters, such as network, CPU and/or memory speed, and/or it may be a function of a current load of the system 102. An underlying motivation of bounded staleness is that front end 108 may present near real-time event streams, and a certain amount of delay may be acceptable. Generally stated, a time bound, $\Theta$, exists that, for each edge that is a member of a set of edges, E, or u→v∈E, a query action by v issued at a time t returns each event posted by u at time t−$\Theta$, or before.

Event streams may comprise a list of events, which may or may not be filtered using a filtering criteria, such as without limitation an application-specific relevance criteria and/or other filtering criteria. Staleness of event streams may be different from request latency, e.g., timing of a response to a request by system 102. Embodiments of the present disclosure may indirectly address request latency, e.g., reducing a throughput load on system 102 makes it more likely to serve event streams with low latency. A trivial, albeit practically unacceptable, way to guarantee bounded staleness could be to have all producers push their events to a single centralized view, and to have all consumers pull from that view. However, using only one view would inherently prevent scaling the system because it would require using only a single data store server.

In accordance with one or more embodiments, non-triviality may be defined such that if a view of a user v contains an event produced by a user u different than user v, then there is an edge, u→v, which edge is a member of a set of edges, E. Referring again to FIGS. 2 and 3, a request schedule determines which edges of a social graph are included in the push and pull sets of a user. In the discussion provided herein, global push and pull sets, which are represented as H and L, respectively. Push set, H, and pull set, L, are subsets of the set of edges, E, of a social graph. The following provides an exemplary formal definition of a request schedule:

Exemplary Definition: A request schedule comprises a pair (H; L) of sets, with a push set H, which is a subset of edge set, E (e.g., H⊂E), and a pull set L, which is a subset of edge set E (e.g., L⊆E). If v is in the push set of u, the edge between u and v is an element of edge set E, e.g., u→v∈E.

Embodiments of the present disclosure determine a request schedule minimizing throughput costs of a workload of a social networking system, such as system 102. By way of some non-limiting examples, throughput costs that may be minimized include a number of messages, number of bytes transferred, etc. A throughput cost of a workload associated with a request schedule may be defined as an overall rate of query and updates performed by the data store servers of the system. The workload may be characterized by a production rate, $r_p(u)$, and the consumption rate, $r_c(u)$, of each user, u, of the system 102. The production and consumption rates indicate an average frequency in which users share new events and request event streams, respectively. Given an edge u→v, a cost incurred by an edge that is a member of a push set, H, which may be expressed as u→v∈H, is $r_p(u)$, e.g., every time u shares a new event, an update is sent to the view of v. Similarly, a cost incurred by an edge that is a member of a pull set, L, which may be expressed as u→v∈L, is $r_c(v)$, e.g., every event stream request from v generates a query to the view of u. The cost of the request schedule (H; L) may be the aggregate of the sum of the production rate, $r_p(u)$, for all edges, u→v, in push set, H, and the sum of the consumption rate, $r_c(v)$, for all edges u→v, in pull set, L, which may be expressed as follows:

$$c(H, L) = \sum_{u \to v \in H} r_p(u) + \sum_{u \to v \in L} r_c(v)$$

The above expression does not explicitly consider differences in the cost of push and pull operations. Push and pull operations may have similar associated costs. Where there are cost differences between push and pull operations, such cost difference may be represented in the above expression. By way of a non-limiting example, where the cost of a pull operation is n times the cost of a push operation, each consumption rate, $r_c(v)$ may be multiplied by a factor equal to n. The cost of updating and querying a user's own view need not be represented in the cost metric because it is implicit. In accordance with one or more embodiments, user views may be maintained by one or more data store servers communicatively-coupled to data store(s) 112. Two vertices of a social graph are co-located where the same data store server maintains their views. Co-location may be easily modeled by associating binary weights to edges in the expression of cost of a request schedule, which cost may be expressed as c(H; L).

As discussed above, embodiments of the present disclosure may be used to address a social dissemination. Such a social dissemination problem may be formally expressed using the following exemplary problem definition:

Problem Definition—Dissemination: Given a social graph G=(V; E), which graph comprises a set of vertices, V and a set of edges, E, and further given a workload with production and consumption rates $r_p(u)$ and $r_c(u)$ for each node, u, of the set of vertices, V, e.g., u∈V, find a request schedule (H; L) that guarantees bounded staleness and non-triviality, while minimizing the cost c(H; L).

In accordance with one or more embodiments, bounded staleness may be achieved by setting an upper bound, Δ, on a time it takes to serve a user request. In accordance with one or more embodiments, optimization of a request schedule using hubs guarantees bounded staleness with Θ=2Δ. In fact, hub optimization may be used to achieve bounded staleness and non-triviality, as shown by the following theorem:

Theorem: Admissible request schedules. A request schedule (H; L) guaranteeing bounded staleness and non triviality on a social graph G=(V; E) is such that, for each edge u→v∈E, it holds that u→v∈H, or u→v∈L, or there exists a vertex w such that u→w∈E, w→v∈E, u→w∈H, and w→v∈L.

A consequence of this theorem is that where a user v pulls events from u, such events need not be copied into the view of v, since other users need not pull events pulled by u. In the example of FIG. 3, events pulled by Billie from Charlie's view 212C need not be stored into Billie's view 212B.

In accordance with one or more embodiments, the above-discussed dissemination problem may be used to find a schedule to cover each of the edges in a social network. In accordance with one or more embodiments, a solution to the dissemination problem may be based on the SetCover problem. Generally, the SetCover problem provides that given a ground set X and a collection $C=\{A_1, \ldots, A_m\}$ of subsets of X, called candidates, such that $\cup_i A_i = X$, each set A in C is associated with a cost c(A). According to the SetCover problem, a goal is to select a sub-collection S ⊂ C that covers all the elements in the ground set, i.e., $\cup_{A \in S} A = X$, and the total cost $\Sigma_{A \in S} c(A)$ of the sets in the collection S is minimized.

Generally, a greedy algorithm may be used for a SetCover problem. An example of a greedy algorithm is as follows: a solution set, S, which is initialized to be a null set, maintains an iteratively growing solution, and a set Z is initialized to X and maintains the uncovered elements of X. As long as Z is not empty, select the set A∈C which minimizes the cost per uncovered element c(A)/|A∩Z| add the set A to the solution (S←S∪{A}), and update the set of uncovered elements (Z←Z\A). Such a greedy algorithm achieves a solution with approximation guarantee O(log Δ), where Δ=max {|A|} is the size of the largest set in the collection C.

In accordance with one or more such embodiments, a solution provides for bounded staleness and non-triviality and provides that a collection C that may comprise two kinds of subsets: edges that are served directly, and edges that are served through a hub. Serving an edge u→v∈E directly through a push or a pull corresponds to covering using a singleton subset {u→v}∈C, and a choice is made between a push and pull according to a hybrid strategy discussed above to serve the edges directly. A hub like the one shown in FIG. 2 may cover three edges, e.g., edges 216AC, 216AB and 216CB, using a push and a pull; the third edge, e.g., 216AB, is served indirectly. Each time the algorithm selects a candidate from C, it adds the required push and pull edges to the solution, e.g., a request schedule (H, L).

Figure 4:
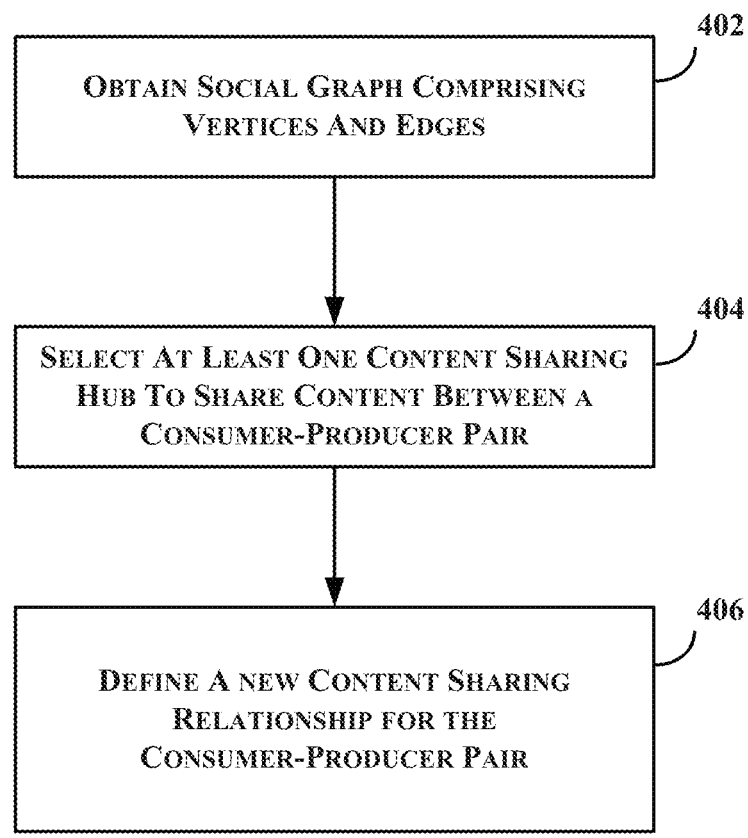

FIG. 4 provides an example of a process flow in accordance with one or more embodiments of the present disclosure. At step 402, a social graph is obtained, which social graph may comprise a plurality of content producers and content consumers. Each content producer may produce, and each content consumer may consume, one or more items of content. The social graph may comprise a set of nodes or vertices, each node or vertex corresponds to a content producer and a content consumer. The social graph may further comprise edges, each edge representing a content sharing relationship for a consumer-producer pair comprising a content consumer and content producer. The content sharing relationship may represent that the content consumer consumes the one or more content items produced by the content producer. Each user, or vertex that represents the user in a social graph, may have an associated production rate and/or consumption rate, and either or both may be input to a process used to determine a request schedule, e.g., greedy s algorithm variant, greedy heuristic and the like.

At step 404, at least one content sharing hub is selected. A content sharing hub may be selected using information provided by the social graph, e.g., the set of vertices and set of edges. The content sharing hub may be selected for at least one consumer-producer pair. By way of a non-limiting example, a social graph may include vertices for users Art, Billie and Charlie, and edges 216AC, 216AB and 216AC. In the example of FIG. 2, there are three consumer-producer pairs, and Charlie's view 212C is a content sharing hub for the consumer-producer pairing between Art and Billie. In accordance with one or more embodiments, a hub for an edge, u→v may be u or v, such as in a case of a direct push operation or a direct pull operation.

At step 406, a new content sharing relationship may be defined for the consumer-producer pair, such as without limitation Art and Billie, using the content sharing hub, such as without limitation Charlie. Using the new content sharing relationship, the content consumer consumes the one or more content items produced by the content producer via the content sharing hub. In accordance with one or more embodiments, a request schedule is generated, which includes a push operation between the producer and the content sharing hub and a pull operation between the content sharing hub and the consumer. By way of a non-limiting example, content is shared between Art and Billie by pushing events from Art's view 212A to Charlie's view 212 and pulling events from Charlie's view 212C to Billie's view 212B. Since events are already being shared between Art and Charlie and between Charlie and Billie, the data store accesses used share events between Art and Charlie and Charlie and Billie may also be used to share events between Art and Billie. In so doing, any data store access operations that would otherwise be needed to share events directly between Art and Billie can be eliminated.

In accordance with one or more embodiments of the present disclosure, a request schedule is generated, which schedule may be used to make data store requests and update user's views and event streams. In accordance with one or more embodiments, the request schedule comprises information, which identifies, for each consumer-producer pair, whether events, or items of content, are pushed from the producer to the consumer or pulled from the producer to the consumer. By way of a non-limiting example, the request schedule comprises a push set, H, which identifies those consumer-producer pairs for which a push operation is to be used, and further comprises a pull set, L, which identifies those consumer-producer pairs for which a pull operation is to be used. In accordance with one or more such embodiments, a greedy algorithm variant, which is discussed below, may be used to generate a request schedule. In accordance with one or more alternate embodiments, a greedy heuristic algorithm, which is also discussed below, may be used to generate a request schedule.

FIG. 5 provides an example of a greedy algorithm variant for use in accordance with one or more embodiments of the present disclosure. The example greedy algorithm variant provides a variant of SetCover that identifies a request schedule that optimizes the dissemination problem. The ground set comprises the edges, E, of a social graph, G=(V, E), which edges are to be covered, either indirectly via a hub or directly. In the example shown in FIG. 5, steps 5 to 8 add to the candidate set, C, e.g., add to priority queue, Q. As is described below, a maximal hub graph, G(w), centered about a hub vertex, w, is determined, and a densest subgraph, S, in the hub graph, G(w), is determined. In a second portion of the greedy algorithm variant, steps 9 to 18 are iteratively performed to select subgraphs having minimal associated cost from the priority queue, Q, until all edges of the social graph, G, are covered either directly, e.g., a push or pull operation between a consumer and producer pair, or indirectly, e.g., via a hub. The greedy algorithm variant returns, at step 19 in FIG. 5, a request schedule (H, L), which includes one or more hubs, each of which indirect cover edges, a hub.

In accordance with one or more embodiments, the greedy algorithm variant iteratively selects the candidate subgraphs that are inserted in the priority queue, Q. Theoretically, the set of candidates may have exponential cardinality because it contains all possible hubs. In accordance with one or more embodiments, a minimum cost-per-element may be invoked to find an approximate solution of the SetCover problem without materializing all candidates. This makes the cardinality of the set of candidates irrelevant, such that it may be exponential.

Figure 6:
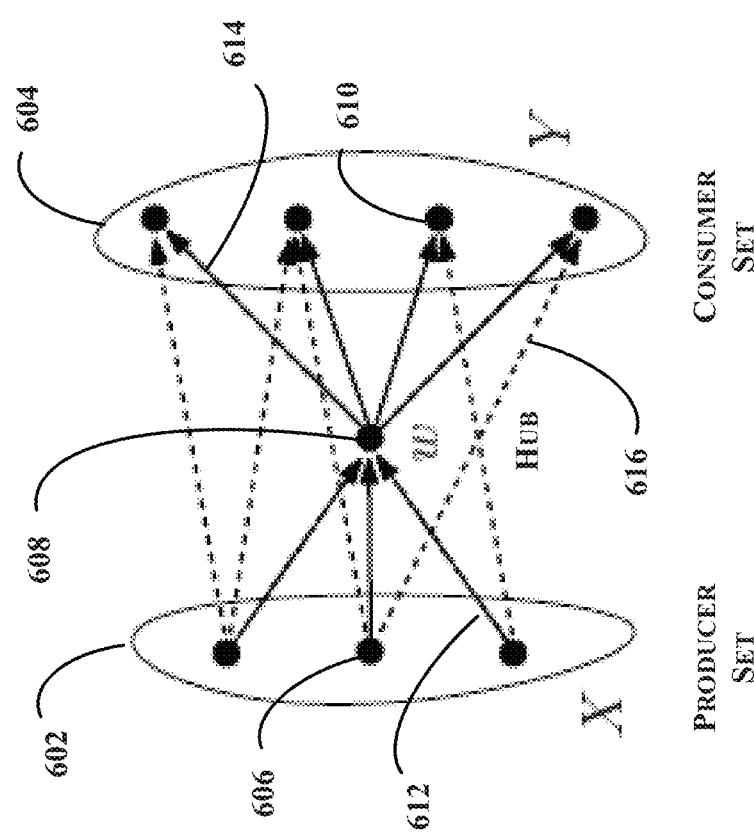

In accordance with one or more embodiments, steps 5-8 of the greedy algorithm variant shown in FIG. 5 may comprise first and second determinations, each of which may be solved in polynomial time. The first determination involves adding to the candidate set, C, for each vertex w, a hub graph centered on w that covers the largest number of edges at a lowest cost. By way of a non-limiting example, a hub graph centered on w is a generalization of the sub-graph of FIG. 2. FIG. 6 provides an example of a hub graph centered on w in accordance with one or more embodiments of the present disclosure. The example provided in FIG. 6 shows a subgraph of a social graph where a producer set, 602, which is also denoted by the letter X, and a consumer set, 604, which is also denoted by the letter Y. The producer set X comprises users that produce events, or content, i.e., content producers. The consumer set, Y comprises users that consumer events, or content, i.e., content consumers. FIG. 6 further illustrates a user, which may also be referred to as a view or user view, which acts as a hub 608, such that events produced by one or more producers 606 of producer set 602 may be shared with one or more consumers 610 of consumer set 604. In the example, each solid edge 612 pointing to hub w is served with a push operation, each dashed edge 614 pointing from hub w is served with a pull, and each dashed edge 616 is covered indirectly.

A second determination involves selecting a best candidate of C, which contains a number of hub graph elements and a number of edges. As discussed above, where a hub graph is selected comprising a set of producers and a set of consumers, each edge from a vertex, x, in X to w is set to be a push, and each edge from w to a vertex, y, in Y is set to be a pull, such that the edges between vertices of X and Y are covered indirectly via the hub.

In the first determination, which involves adding to the candidate set, C, for each vertex, w, a hub graph centered on w that covers the largest number of edges at a lowest cost, each vertex u of a hub graph centered on w is associated with a weight g(u) reflecting an associated cost of u. By way of a non-limiting example, for each vertex of a producer, x, in the set of producers, X, a weight, g(x), may be set equal to the producer's production rate, $r_p(x)$, e.g., such that a cost of a push operation from x to w is associated with a producer vertex x. Similarly, for each vertex of a consumer, y, in a set of consumers, Y, a weight g(y) may be set equal to the consumer's consumption rate, $r_c(y)$, e.g., such that the cost of a pull operation from y to w is associated with a consumer vertex y. A weight, g(w), for the hub vertex, w, of the hub graph may be set to 0.

In accordance with one or more embodiments, W and E(W) are the set of vertices and edges of a hub graph, (W, E(W)), respectively, and an aggregate cost, g(W), associated with the set of vertices, W, of the hub graph may be determined to be the sum of the cost of each vertex in the hub graph, which may be expressed as follows:

$$g(W) = \Sigma_{u \in W} g(u)$$

In accordance with the above example, the cost, g(W), is the sum of the production rate of each producer and the consumption rate of each consumer in the hub graph. A cost-per-element, or vertex representing a consumer or a producer, of a hub graph (W, E(W)) may be expressed as:

$$p(W) = \frac{g(W)}{|E(W)|} \qquad \text{Eq. (1)}$$

In other words, a cost-per-element of a hub graph, (W, E(W)), may be determined by dividing the cost, g(W), by a cardinality of, or number of edges in, the set of edges, E(W), of the hub graph. In accordance with one or more embodiments, the first determination may be expressed as finding, for each vertex w of a social graph, G=(V, E), a hub graph (W, E(W)) centered on w that minimizes the cost-per-element, p(W), determined for the hub graph. In accordance with one or more embodiments, by minimizing the cost-per-element the density may be maximized.

The first and second determinations may be addressed using DensestSubgraph functionality, which may be expressed using the following Problem Statement:

Problem Statement—Densest Subgraph: Let G=(V, E) be a graph comprising a set of vertices, V, and a set of edges, E. For a set, S, which is a subset of vertex set, V, e.g., S ⊂ V, E(S) denotes the set of edges of G between vertices of S. The DensestSubgraph determines the subset, S, that maximizes a density function, such as the following:

$$d(S) = \frac{|E(S)|}{|S|}.$$

Using the above density function, a candidate may be added to a candidate set, C, for each vertex w, where the candidate is a hub graph centered on w that covers the largest number of edges at a lowest cost. The hub graph candidate that is added to the candidate set may be a subgraph, S, of the hub graph, G(W), determined for vertex w. Where the vertices of S are weighted in accordance with the weightings of the weight functions defined above, a weighted variant may be obtained by replacing the density function d(S) with:

$$d_w(S) = \frac{|E(S)|}{g(S)}.$$

Let $G_w$, which corresponds with G(w) formed in step 6 of FIG. 5, be the largest hub graph centered in a vertex w, e.g., the hub graph in which X and Y include all producers and consumers of w, respectively. A sub graph (S, E(S)) of $G_w$ that maximizes the density function, e.g., $d_w(S)$, minimizes the cost-per-element of the subgraph, p(S), which may be determined using Eq. 1, where S is used in place of W. In accordance with one or more embodiments, the DensestSubgraph function uses the weighted version of density function, $d_w(S)$, to identify a candidate subgraph of the maximal hub graph centered on w to be included in a set of candidates, C, e.g., a set of candidate subgraph, each determined to maximize a density function and thereby minimizing a cost-per-element for the hub graph. In the example of FIG. 5, the candidate subgraph is inserted in a queue, Q, with an inverse value of the density function, which inverse value may also be said to be the cost-per-element for the subgraph.

In accordance with at least one embodiment, the Densest-Subgraph may be approximated as follows: start with social graph and proceed until the graph is empty, iteratively identify and remove the node with the lowest degree, e.g., remove the node with the least number of edges connected to the node (incident edges), and remove its incident edges. In accordance with one or more embodiments, ties in degree may be arbitrarily broken. Among all subgraphs considered during the execution of the algorithm return the one with the maximum density. The density of a subgraph, d(S), may be used. In accordance with one or more embodiments, $d_w(S)$ may be used as the density of the subgraph, which may be maximized. In accordance with one or more such embodiments, in each iteration instead of removing the node with the lowest degree, the node that minimizes a "weighted degree", which is defined as $d_g(u)=d(u)/g(u)$, where d(u) is a degree of node u is removed, together with its incident edges.

In accordance with one or more embodiments, the algorithm shown in FIG. 5 iteratively performs its steps until all edges of E are covered. The DensestSubgraph problem considers the choices done in previous steps, and the DensestSubgraph function takes the sets H, L and Z as input. The sets H and L are used to update the vertex weights, e.g., g(u). Where a previous step has added an edge (x→w) to the push set, H, the cost of pushing over that edge has already been paid, and a weight, g(x), associated with the edge, x, is updated to be g(x)=0 for all hub graphs G(w) for which x∈X(w). Similarly, if an edge (w→y) is already in the set L, then g(y) is set to 0 for all hub-graphs G(w) for which y∈Y(w).

In accordance with one or more embodiments, a set of edges covered by a hub graph includes elements of Z that have not already been covered. Therefore, a density function of the DensestSubgraph function may be defined as:

$$d(s) = \frac{|E(S) \cap Z|}{g(S)}.$$

In accordance with one or more embodiments, the greedy algorithm of FIG. 5 may be used to optimize request scheduling using a static social graph. Incremental updates to the social graph may be implemented as follows: if an edge is added, it may be served directly. Where a pull edge u→v is removed, where u is a hub, any edges pointing to v that are covered via u may be served directly. Similarly, in a case where v is a hub and the edge is a push edge, all edges pointing to u that are covered via v may be served directly. Over time, social graph updates may result in the modified request schedule converging to one that might be produced by a hybrid approach. The greedy algorithm variant or another algorithm described herein may be executed periodically using the updated social graph to generate a request schedule, e.g., a request schedule that optimizes, e.g., minimizes, costs. Since such a convergence is likely to occur slowly, generation of a request schedule using the greedy algorithm variant or another algorithm described herein may be performed infrequently.

Figure 7A:
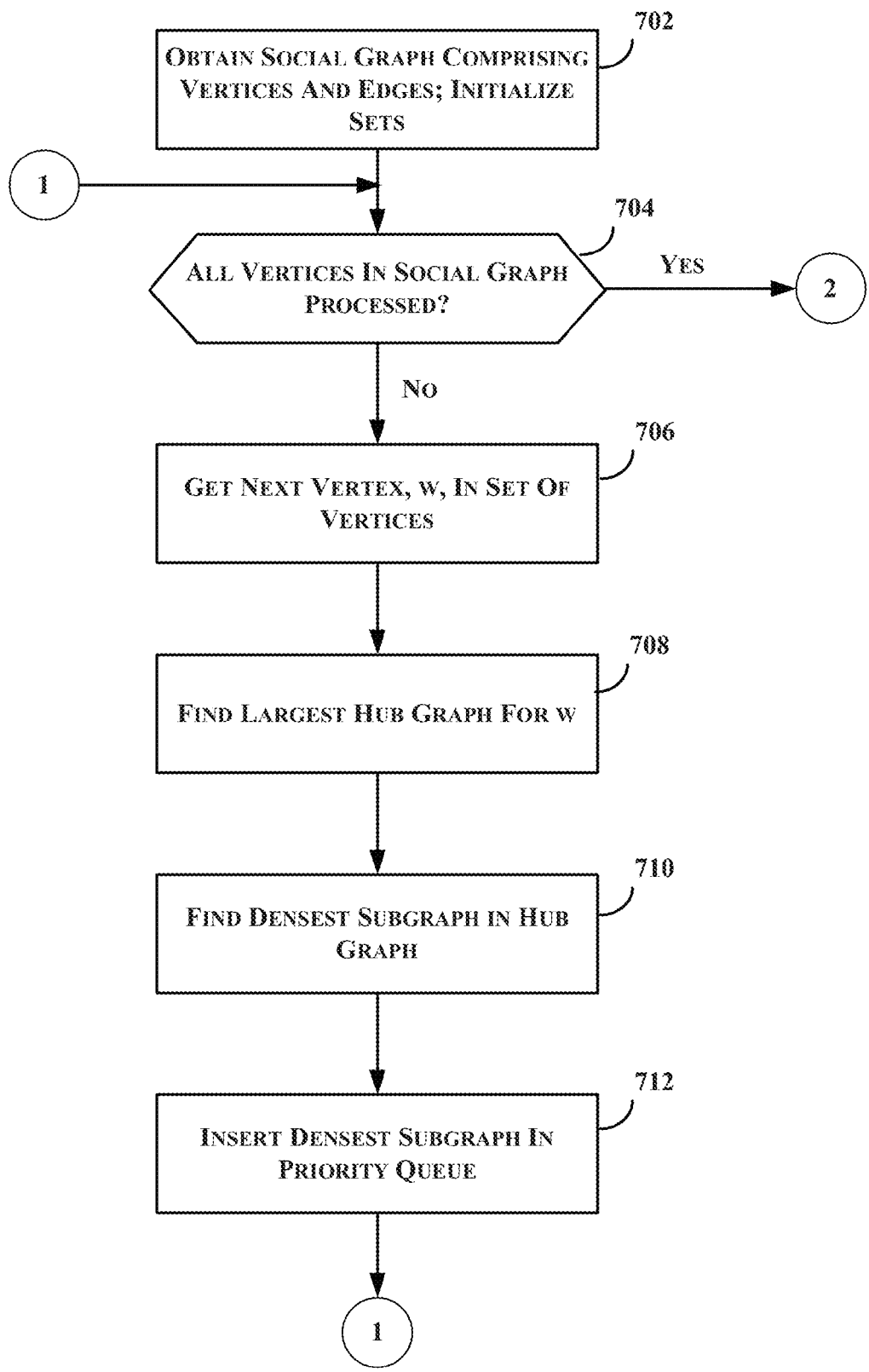
Figure 7B:
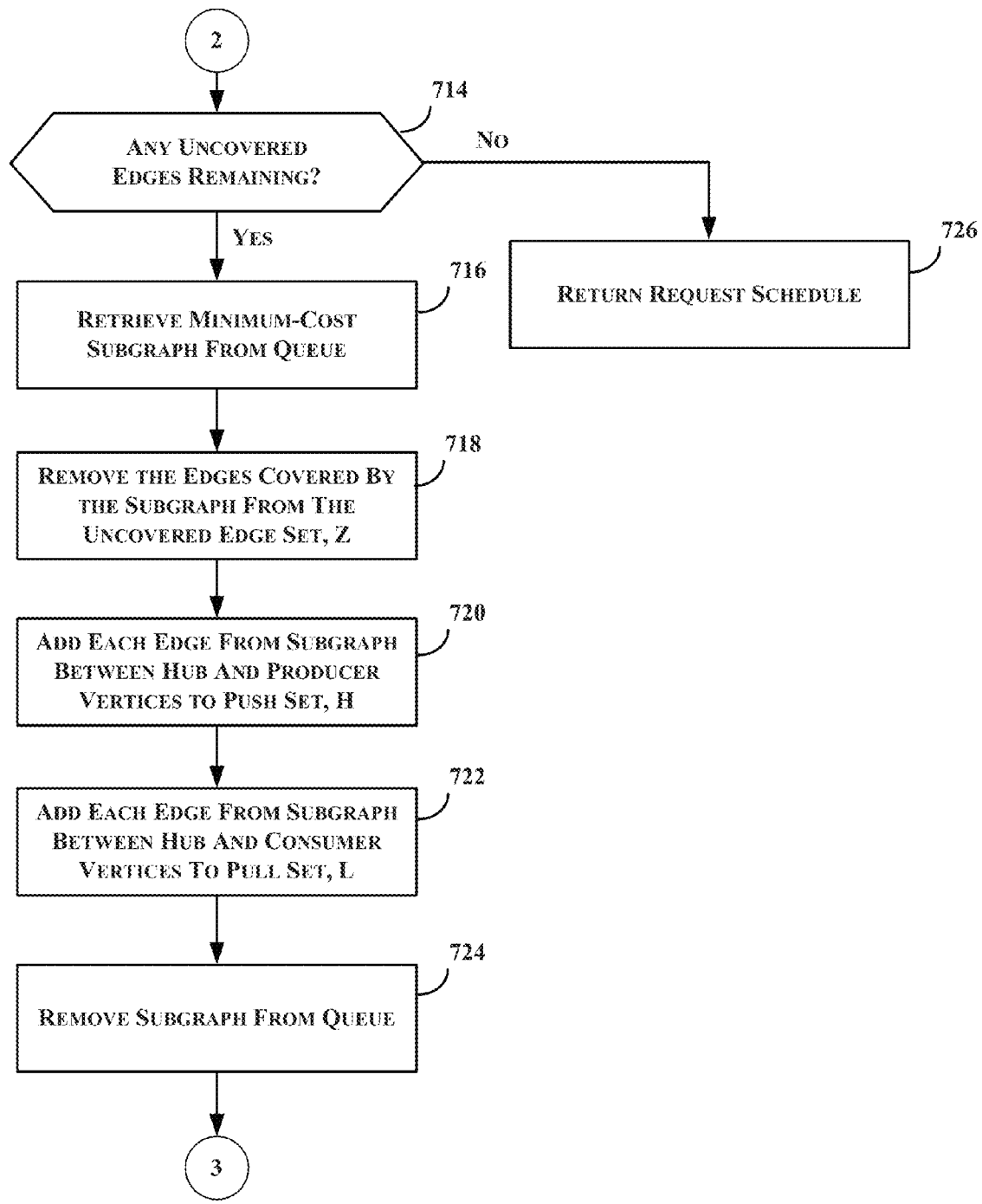
Figure 7C:
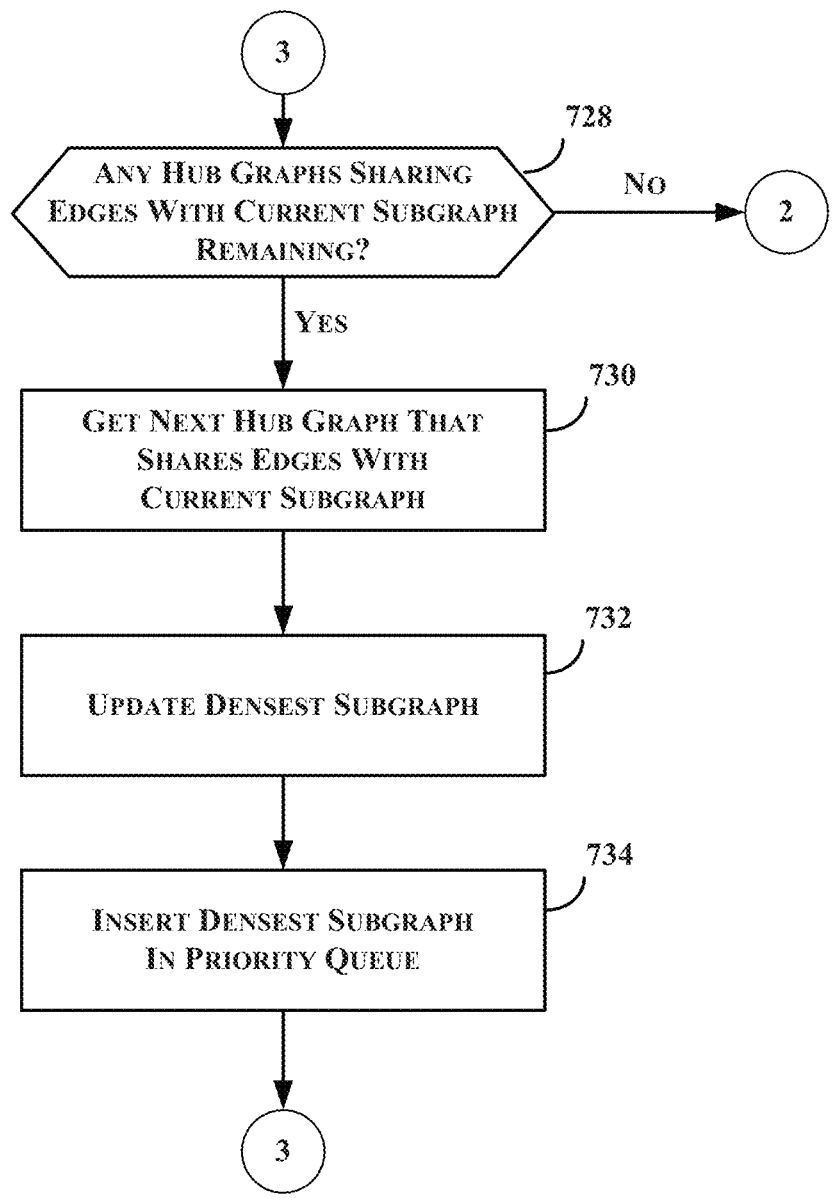

FIG. 7, which comprises FIGS. 7A, 7B and 7C, provide a process flow of the greedy algorithm variant for use in accordance with one or more embodiments of the present disclosure. With reference to the process flow of FIG. 7 and the greedy algorithm variant pseudocode shown in FIG. 5, the steps of FIG. 7A generally correspond to steps 5-8 of FIG. 5, and the steps of FIGS. 7B and 7C generally correspond to steps 9-19 of FIG. 5.

At step 702 of FIG. 7A, a social graph comprising vertices and edges between the vertices is obtained. In accordance with one or more embodiments, other input such as and without limitation production and consumption rates associated with vertices of the social graph may also be obtained. At step 704, a determination is made whether or not all of the vertices in the social graph have been processed. By way of a non-limiting example, step 704 may determine whether or not the steps of FIG. 7A have been performed for each of the vertices in the social graph. If it is determined, at step 704, that all of the vertices have been processed, processing continues at step 714 of FIG. 7B. If not, processing continues at step 706 with a vertex, w, that has not yet been processed. At step 708, a maximal hub graph is identified, which has w has the hub. As discussed above, a maximal hub graph may identify all producers and consumers of w. At step 710, the hub graph is analyzed to identify a densest subgraph of the maximal hub graph determined for w. As discussed above, the densest subgraph may be determined using a density function.

At step 712, the densest subgraph of w is inserted in a priority queue, e.g. queue Q, and processing continues at step 704 to process any vertices remaining from the social graph. In accordance with one or more embodiments, the subgraph's entry in the queue includes a value determined using a density function.

Referring to FIG. 7B, one or more subgraphs are selected from the priority queue until all of the edges from the social graph are covered. By way of a non-limiting example, each subgraph has an associated cost, which cost is a function of the density value determined for the subgraph using a density function. The subgraph that is selected is that subgraph in the priority queue that has the least associated cost, minimal associated density function value, relative to the other subgraphs remaining in the priority queue. Thus, at step 714 of FIG. 7B, a determination is made whether or not all of the edges of the social graph are covered. If so, the request schedule generated using the greedy algorithm variant is returned at step 726.

As discussed herein and by way of a non-limiting example, a request schedule comprises one or more sets of edges, each of which is to be serviced, e.g., by a data store or data stores, and whether the edge is to be serviced using a push operation or a pull operation. Each edge that is identified by the request schedule has a producer at one end and a consumer at the other end. Inclusion of the edge in a push set, H, indicates that updates from the producer are pushed to the consumer using a push operation, e.g., as the producer generates a new event. Conversely, inclusion of the edge in a pull set, L, indicates that updates from the producer are pulled from the producer to the consumer, e.g., as the consumer requests an updated event stream.

Where it is determined, at step 714, that all of the edges of the social graph are not covered, processing continues at step 716 to retrieve a subgraph from the priority queue that has the least associated cost relative to the other subgraphs in the priority queue. The retrieved subgraph has a hub vertex, w, a set of producer vertices, X, and a set of consumer vertices, Y. At step 718, the edges covered by the selected subgraph are removed from the uncovered edge set, Z. At steps 720 and 722, the edges from the selected subgraph are associated to a push set, H, or a pull set, L, of the request schedule. That is, each edge between the hub vertex and a producer vertex is assigned to the push set, H, and each edge between the hub vertex and the consumer is assigned to the pull set, L. At step 724, the selected subgraph is removed from the priority queue, Q.

In accordance with one or more embodiments, any hub graphs that share edges with the selected subgraph may be updated in light of the fact that some or all of the shared edges are now covered by the selected subgraph. In accordance with one or more such embodiments, such hub graphs are processed again to identify a densest subgraph. Thus, at step 728 of FIG. 7C, a determination is made whether any such hub graphs remain to be processed. If not, processing continues at step 714 to determine whether there are any uncovered edges and to select another subgraph where it is determined that there are edges of the social graph that are not covered. If it is determined, at step 728, that there hub graphs remaining to be processed, processing continues at step 730 to get the hub graph that shares edges with the selected subgraph. At step 732, a densest subgraph is determined for the selected hub graph and the subgraph is added to the priority queue, Q, at step 734.

In accordance with one or more embodiments, a greedy heuristic may be used to solve the dissemination problem and generate a request schedule. FIG. 8 provides exemplary pseudocode of a greedy heuristic for use in accordance with one or more embodiments. The greedy heuristic search for hub graphs that reduce the cost of dissemination. The greedy heuristic algorithm of FIG. 8 iteratively builds hub graphs. By way of a non-limiting example, the hub graphs may be built according to a predefined order and may consider a limited number, e.g., predefined classes, of hub graphs centered at a vertex, w. Where $E(X,Y)$ denotes a set of edges of a hub graph between vertices of a set of producers, X, and a set of consumers, Y, for a hub graph $G(X, w, Y)$, the greedy heuristic algorithm determines whether or not to cover cross edges in $E(X, Y)$, e.g., edges between vertices in set X and vertices in set Y, via a hub w where it is determined that use of a hub w is cheaper than covering the cross edges directly. By selecting a hub graph, each of the cross edges may be covered indirectly, via a hub w. In the example shown in FIG. 8, covered edges are added to a set of covered edges, C, e.g., in steps 15 and 16. In addition to covered edge set, C, the greedy heuristic shown in FIG. 8 maintains a set of covered push edges, H, and a set of covered pull edges, L, respectively.

In accordance with one or more embodiments, in the greedy heuristic, exemplary criterion or criteria for selecting a hub may be based on whether or not using the hub reduces the cost as compared to a baseline cost. In accordance with one or more embodiments, a baseline cost may be determined to be a cost of a schedule determined using the hybrid approach. As discussed above and according to the hybrid approach, an edge, x→y, between a producer, x, and a consumer, y, becomes a push edge where the rate of production, $r_p(x)$, of the producer, x, is less than the rate of consumption, $r_c(y)$, of the consumer, y, and a pull edge, otherwise, e.g., where $r_p(x) >= r_c(y)$, the edge becomes a pull edge. The cost of such an edge, x→y, under a hybrid approach, or in a hybrid schedule determined using the hybrid approach, may be expressed as $c^*(x \to y) = \min\{rp(x), rc(y)\}$.

In accordance with one or more embodiments, selecting a hub graph, denoted as $G(X, w, Y)$, saves the cost of covering cross edges between vertices in sets X and Y directly, e.g., the baseline cost c*(x→y) for each cross edge covered by the hub, which results in a cost reduction, or negative cost, p(X, w, Y), which may be expressed as follows:

$$p(X, w, Y) = \sum_{x \in X, y \in Y, (x \to y) \in E} c*(x \to y)$$

The expression may be valid for an evaluation of some number of hub graphs initially selected. Selecting a hub-graph adds edges into the sets, H, L and C. After a hub graph is selected, a cost reduction may be said to only occur for those edges that are not already in sets H and L. Furthermore, where an edge has already been added to covered edge set C, it has already been covered through another hub, and there is no cost reduction in covering it again. Therefore, after selecting the first hub graph, the cost reduction may be limited to those edges that are in edge set E that are not in set C, H or L, which may be expressed as, E\C∪H∪L.

In accordance with one or more embodiments, a positive cost of selecting a hub graph, G(X, w; Y) may be considered. In accordance with one or more such embodiments, a positive cost of selecting a hub graph, G(X, w; Y), may be computed for edges E(X, w) and edges E(w, Y), which are scheduled as push and pull edges, respectively. The cost of an edge, e=x→y, in e(X, w), may be determined as follows:

$$c_X(e) = \begin{cases} r_p(x) & \text{if } e \in L \setminus H \\ r_p(x) - c_*(e) & \text{if } e \notin (H \cup L) \\ 0 & \text{if } e \in H \end{cases}$$

In a case where the edge, e, is a member of the pull set, L, and not the push set, H, as denoted by e∈L\H in the first line, the greedy heuristic has already determined, in connection with a previously-selected hub graph, that the edge is to be served by a pull operation and not a push operation in the request schedule generated by the greedy heuristic. Selecting the current hub graph for the request schedule, would result in the edge being served by both a pull and a push operation, which would incur an additional cost of $r_p(x)$. In the second case, if the edge e is not in the set H∪L, the greedy heuristic has not yet scheduled the edge. In such a cast, an additional cost of pushing over e depends on the cost of covering e directly, which is c*(e) using the cost determined using the hybrid approach. Where, as is indicated in the third line, edge e is already served by a push, there is no additional cost. The cost $c_Y(w \to y)$ of an edge, e=w→y, in E(w, Y) is specular.

In accordance with one or more embodiments, an overall cost c(X, w, Y) of a hub graph G(X, w, Y) may be determined to be the sum of $c_X(x \to w)$ for every edge x∈X and $c_Y(w \to y)$ for every edge y∈Y, which may be expressed as follows:

$$c(X, w, Y) = \sum_{x \in X} c_X(x \to w) + \sum_{y \in Y} c_Y(w \to y).$$

In accordance with one or more embodiments, the greedy heuristic determines whether or not to select the hub graph, G(X, w, Y), by determining whether or not the gain, or cost reduction, P(X, w, Y) is greater than the negative cost, c(X, w, Y). Such a determination may be expressed as p(X, w, Y)−C(X, w, Y)>0, where the gain associated with using the hub is greater than the cost associated with using the hub, the greedy heuristic chooses the hub graph, and schedules the edges in the hub graph. As discussed above, a push operation may be scheduled for each producer edge, x, and a pull operation may be scheduled for each consumer edge, y, included in the hub graph for the hub, w.

As discussed above, in accordance with one or more embodiments, hub graphs may be built by the greedy heuristic in a given, e.g., predefined, order. By way of a non-limiting example, the greedy heuristic may build hub graphs G(X, w, {y}) for each edge (w→y), where X includes all nodes x having an uncovered cross edge pointing toy. Selecting large X sets leads to a large number of covered cross edges, and thus to potentially high gains.

With reference to FIG. 8, steps 4 to 10 of the greedy heuristic selects a number of hub graphs using the selection criteria discussed above, p(X, w, Y)−C(X, w, Y)>0. Additionally, edges between producers and the hub are added to a push set, H, edges between hub and consumers are added to a pull set, L, and edges covered by the hub, e.g., each edge between a producer and consumer are added to the set of covered edges, C. After performing the hub graph selection in steps 4 to 10, the greedy heuristic shown in FIG. 8 performs steps 11 to 16 to determine whether or not it is appropriate to add additional consumers, to Y, e.g., to enlarge the set of consumers. A rationale is that, for each selected hub graph G(X, w, Y), the costs of pushing over the edges in E(X, {w}) have already been paid. Therefore, given a node y pointed to by w and not already in the set Y, a consumer that is not yet covered, e.g., uncovered cross edges in E(X, {y})∩E, might be covered via w by adding only the cost of the consumer, $r_c(y)$, that is being added. Where G(X, w, Y) is selected, the view of w stores events from users x∈X, each of which is, by definition, a producer of w.

In accordance with one or more embodiments, the greedy heuristic operates on a static social graph. Updates may be handled as discussed above in connection with the greedy algorithm variant.

FIG. 9, which comprises FIGS. 9A-9E, provides an example of a greedy heuristic process flow in accordance with one or more embodiments. With reference to the process flow of FIG. 9 and the greedy heuristic pseudocode shown in FIG. 8, the steps of FIGS. 9A and 9B generally correspond to steps 4-10 of FIG. 8, the steps of FIGS. 9C and 9D generally correspond to steps 11-16 of FIG. 8, and the steps of FIG. 9E generally correspond to steps 17-22 of FIG. 8.

Figure 9A:
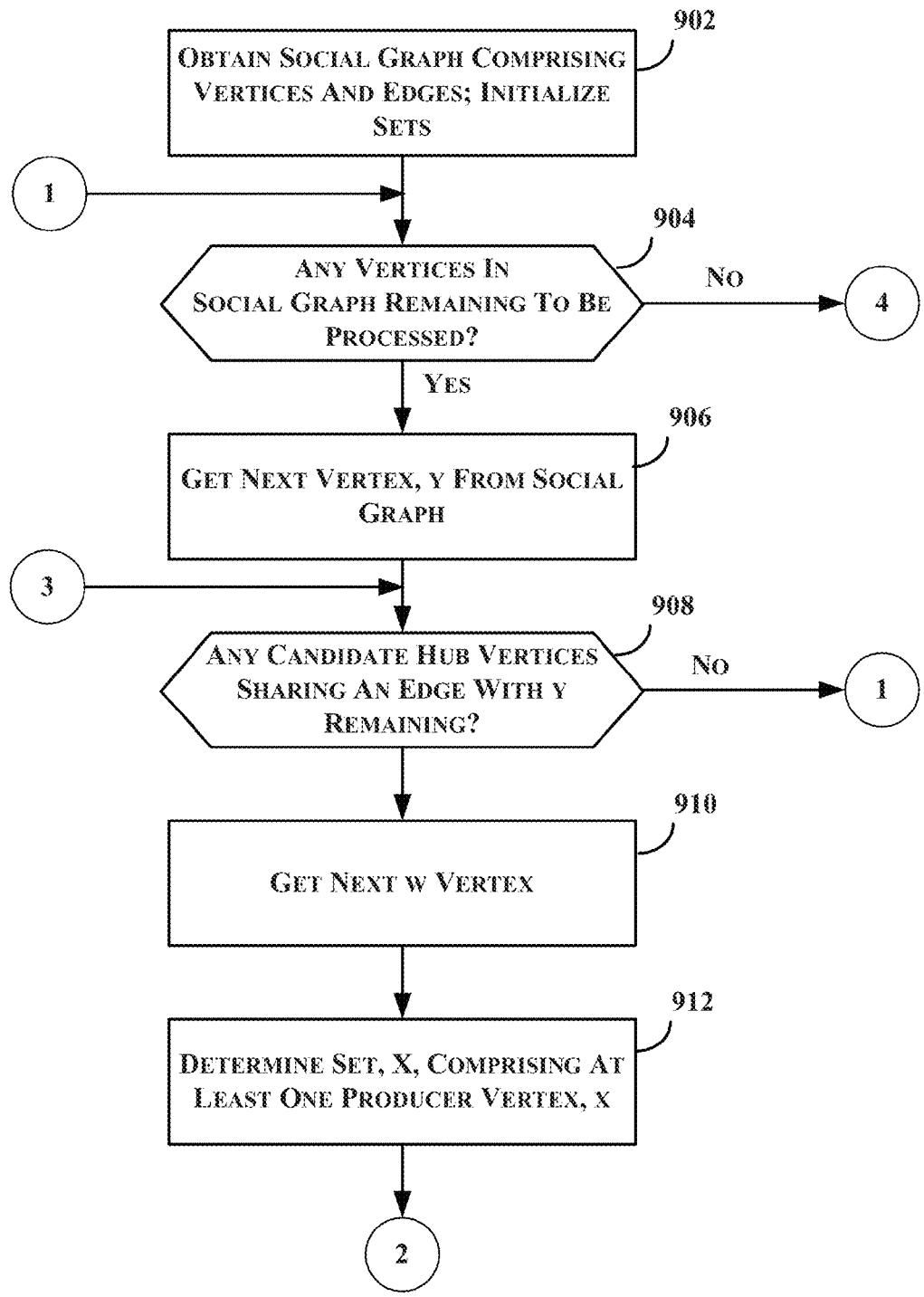

Referring to FIG. 9A, at step 902, a social graph is obtained, which comprises a set of vertices and a set of edges. In accordance with one or more embodiments, other input such as and without limitation production and consumption rates associated with vertices of the social graph may also be obtained. At step 904, a determination is made whether or not any vertices in the social graph remaining to be processed. By way of a non-limiting example, step 904 may determine whether or not the steps of FIGS. 9A and 9B have been performed for each of the vertices in the social graph. If it is determined, at step 904, that all of the vertices have been processed, processing continues at step 924 of FIG. 9C. If there are vertices remaining to be processed, processing continues at step 906 to get the next vertex to be processed from the social graph. At step 908, a determination is made whether or not there are any candidate hub vertices that remain to be processed and that share an edge, which is not yet covered, with the selected vertex. The determination performed at step 908 searches for producers for a selected vertex, y. If not processing continues at step 904 to process any remaining vertices in the social graph. If there is at least one candidate hub vertex remaining to be processed, processing continues step 910 to get the next candidate hub vertex, w. At step 912, a set, X, of candidate producers is determined. By way of a non-limiting example, for each candidate producer, there is an edge between the candidate hub that is not yet covered by a hub and an edge with a consumer that is not yet covered by a hub, is not a member of the push set, H, or the pull set, L.

Figure 9B:
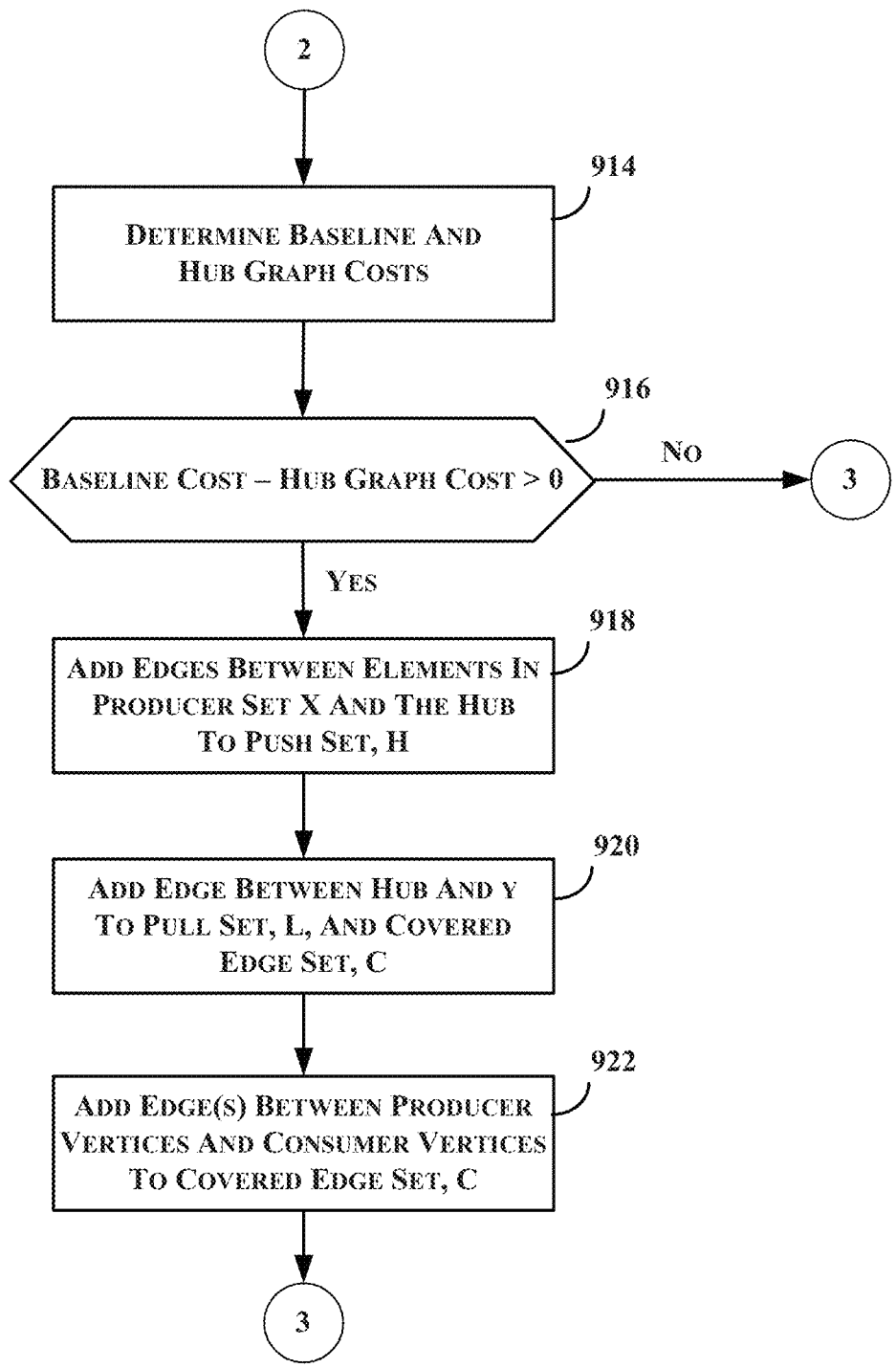

At step 914 of FIG. 9B, baseline and hub graph costs are determined. The costs may be determined as discussed above. At step 916, a determination is made whether or not the baseline cost is greater than the hub graph cost, e.g., a determination is made whether a cost savings over the baseline is achieved using the hub graph. If not, processing continues at step 908 to process any remaining candidate hub vertices. If so, processing continues at steps 918, 920 and 922 to add the edge(s) between producer vertex(es) and the hub vertex to the push set, H, add the edge(s), between the hub vertex and the consumer vertex(es), to the pull set, L, and to add the edge(s) between the producer and the consumer vertices covered by the hub graph to the set of covered edges, C.

Figure 9C:
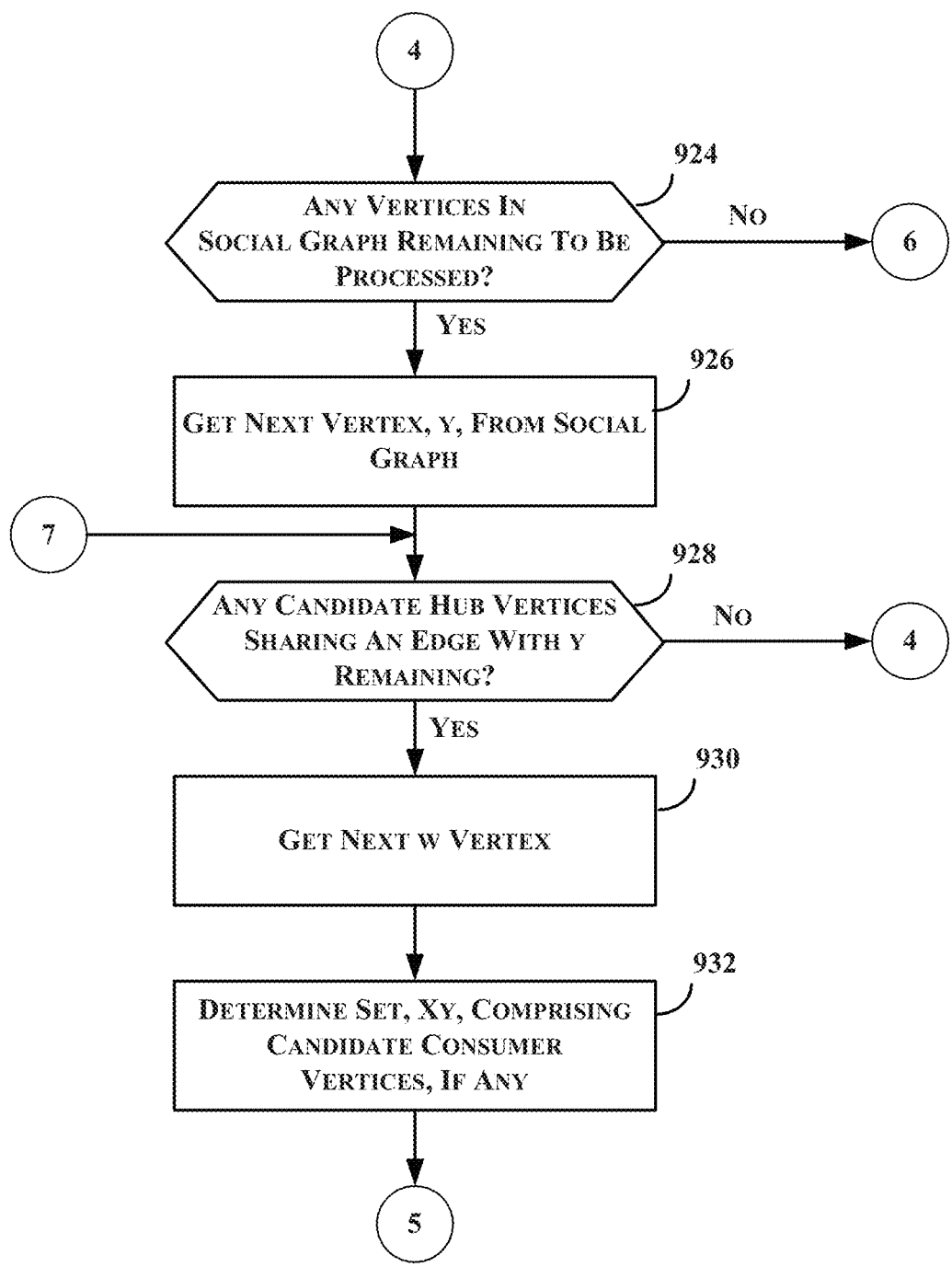

In accordance with one or more embodiments, hub graphs may be analyzed to determine whether or not each hub graph may be extended to service one or more additional consumer vertices. In accordance with one or more embodiments each vertex in the social graph is examined to determine whether it is a candidate to extend a hub graph, e.g., whether it is a consumer that may be added to an existing hub graph. At step 924 of FIG. 9C, a determination is made whether or not any vertices from the social graph remain to be processed. By way of a non-limiting example, step 924 may determine whether or not the steps of FIGS. 9C and 9D have been performed for each of the vertices in the social graph. If it is determined, at step 924, that all of the vertices have been processed, processing continues at step 942 of FIG. 9E to process any edges that are not yet covered.

Where it is determined at step 924 of FIG. 9C that there are vertices in the social graph that remain to be processed in identifying whether there are any hub graphs that may be extended, processing continues at step 926 to get the next vertex, y, from the social graph. At step 928, a determination is made whether or not there are any more existing hub graphs that might be extended by adding the current vertex, y, as a consumer. If not, processing continues at step 924 to process any remaining vertices from the social graph. If an existing hub graph remains to be considered, processing continues at step 930 to get a hub vertex, w, of a hub graph that remains to be processed and for which there exists an edge between the hub vertex and the current vertex.

At step 932, a set, $X_y$, of candidate producers of y is determined. By way of a non-limiting example, for each candidate producer, there is an edge between the hub vertex, w, and the candidate producer vertex, x, that is a member of the push set, H, and there is an edge between the candidate vertex, y, and the hub vertex, w, that is not yet covered by a hub, and is not a member of the push set, H, or a member of the pull set, L.

Figure 9D:
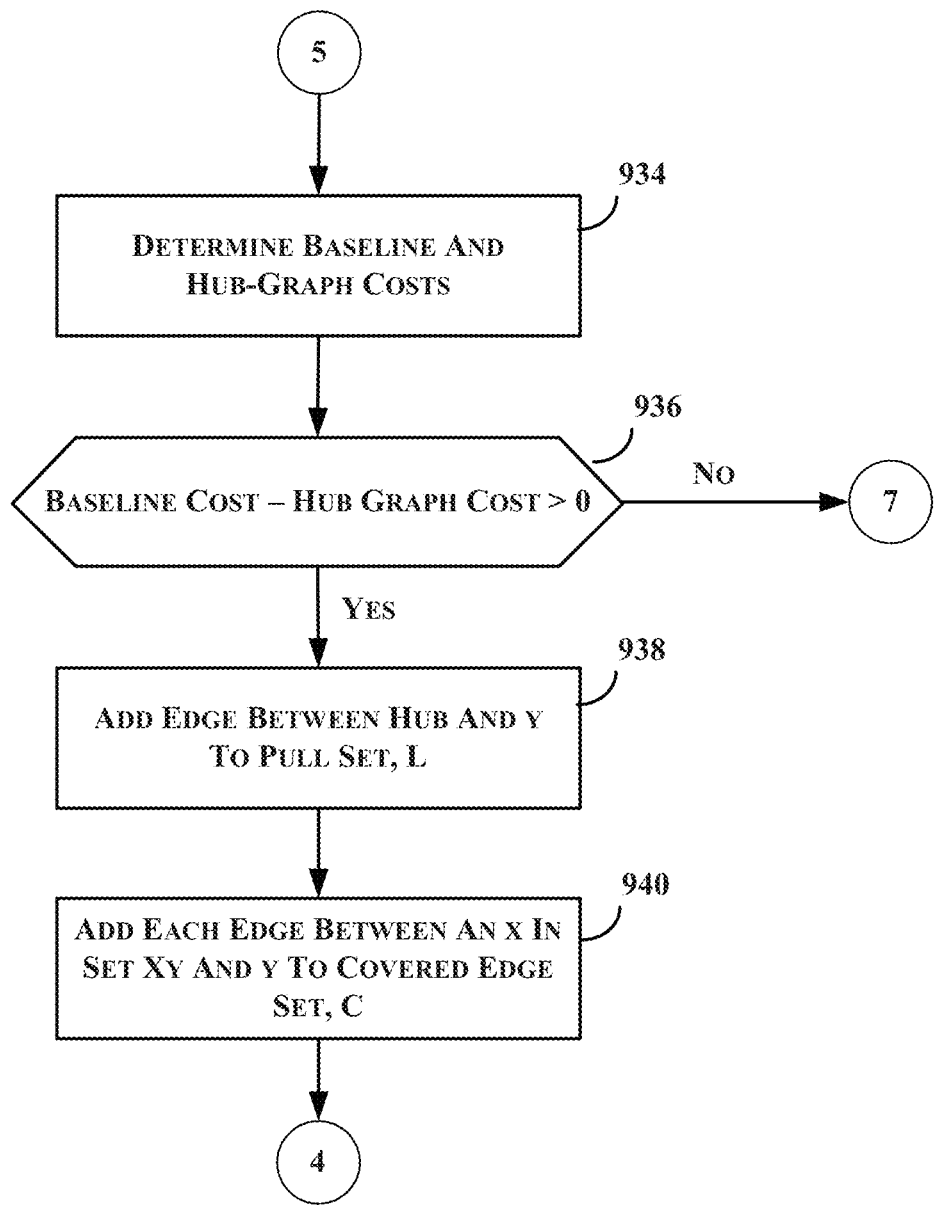
Figure 9E:
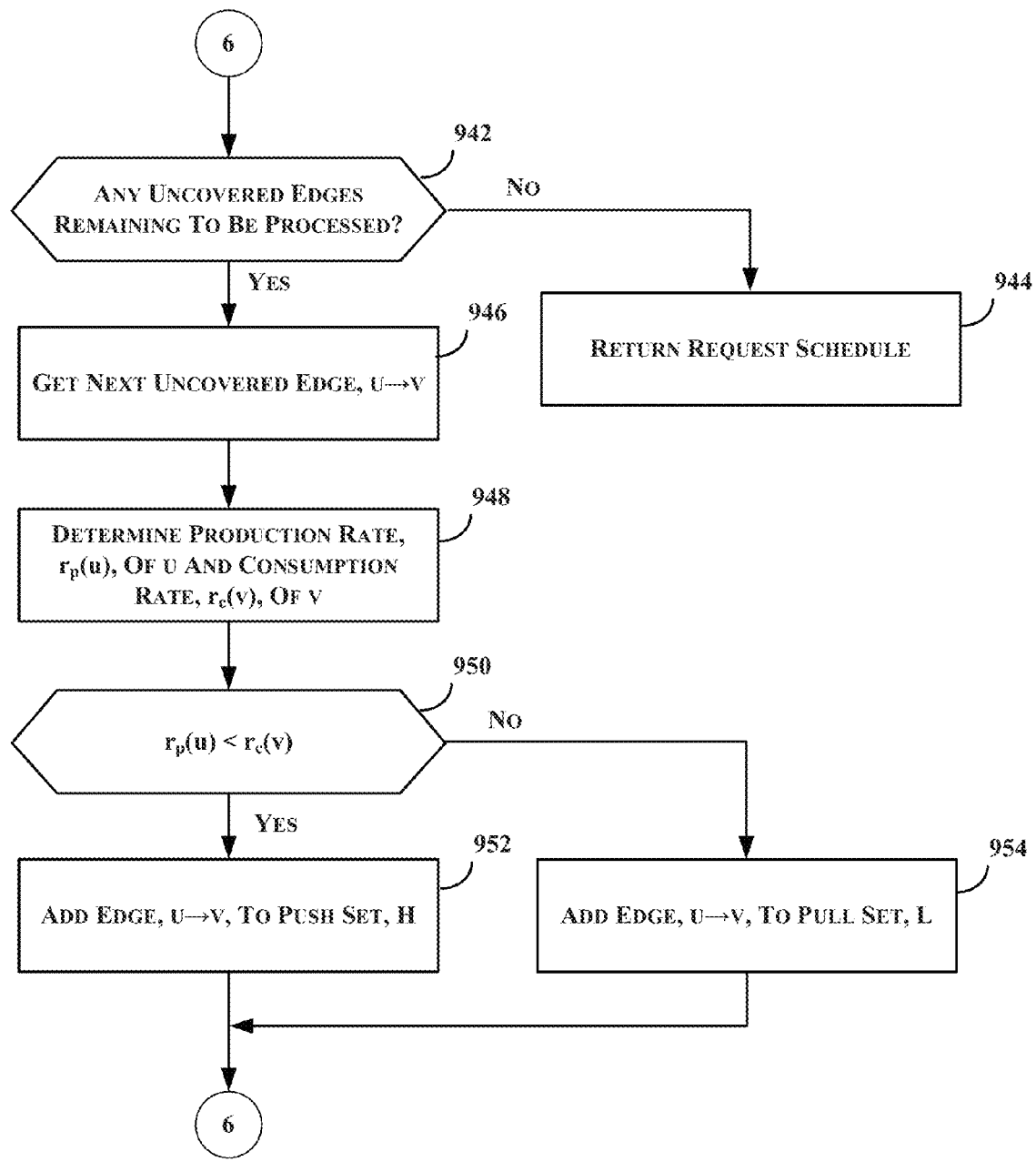

At step 934 of FIG. 9D, baseline and hub graph costs are determined. The costs may be determined as discussed above. At step 936, a determination is made whether or not the baseline cost is greater than the hub graph cost, e.g., a determination is made whether a cost savings over the baseline cost is achieved using the hub graph. If not, processing continues at step 928 to process any remaining candidate hub vertices in connection with the currently-selected vertex, y. If so, processing continues at steps 938 and 940 to add the edges between consumer vertex, y, and the hub vertex, w, to the pull set, L, and to the covered set, L. Processing continues at step 924 of FIG. 9C to process any remaining vertices in the social graph.

In accordance with one or more embodiments, where processing discussed in connection with FIGS. 9A-9D is performed to identify hub graph and determine whether an identified hub graph may be extended, such that as many vertexes as appropriate, e.g., based on optimization, or minimization, of costs, the greedy heuristic proceeds to process any remaining edges not covered by a hub. In accordance with one or more embodiments, the greedy heuristic assigns any uncovered edges to the push set, H, or the pull set, L, using the hybrid approach discussed above. At step 942 of FIG. 9E, a determination is made whether or not there are any uncovered edges remaining to be processed. By way of a non-limiting example, step 942 may determine whether or not the steps of FIG. 9E have been performed for each edge of the social graph that has not yet been covered. If it is determined, at step 942, that all of the uncovered edges have been processed, processing continues at step 944 to output a request schedule generated by the greedy heuristic, which may be a schedule comprising the push set, H, and the pull set, L, identifying the manner in which updates are propagated between consumers and producers of a social network.

If it is determined, at step 942, that there are uncovered edges remaining to be processed, processing continues at step 946 to get the next uncovered edge. The uncovered edge has a consumer at one end and a producer at the other end. At step 948 a production rate of the producer and a consumption rate of the consumer are determined. At step 950, a determination is made whether the producer's production rate is less than the consumer's consumption rate. If the producer's production rate is less than the consumer's consumption rate, processing continues at step 952 to add the edge to the push set, H. If the producer's production rate is greater than or equal to the consumer's consumption rate, processing continues at step 954 to add the edge to the pull set, L. Regardless of the determination made, after the edge is added to the identified edge set, processing continues at step 942 to process any remaining uncovered edges.

In accordance with one or more embodiments a data store, such as data store 112 or data store 212, may be a passive store, which reacts to user requests. In accordance with one or more such embodiments, in the example of FIG. 3, one or more data store servers communicatively coupled to data store(s) 212 may be configured to provide passive stores that react to client operations. Alternatively, data store servers may be configured to propagate information among each other. In accordance with one or more embodiments, data store servers may be configured to provide active stores, where request schedules include push and pull sets, as well as one or more propagation sets. By way of a non-limiting example, a propagation set may be defined such that each edge w→u is associated with a propagation set $P_u(w) \subseteq V$, which contains users that are common subscribers of u and w. Where the view of u stores an event, e, produced by w for the first time, the data store server may be configured to push the event, e, to the view of every user $v \in P_u(w)$. Propagation of events may be restricted to their subscribers in order to respect non-triviality. The following equivalence result shows that it is sufficient to consider only request schedules of passive stores, as any schedule of an active-propagation policy can be simulated by a schedule of a passive-propagation policy with no greater cost.

In accordance with one or more embodiments, active policies may be considered where data stores take actions when they receive query or update requests. Some active data stores may push events periodically; updates received between an end of two periods may be accumulated and considered as a single update. Such schedules may be modeled as active schedules where there is an upper bound on the production rates, which bound may be determined based on accumulation period and communication latency between servers. Larger accumulation periods reduce the system costs but may also increase staleness, which may be unsuitable for highly interactive social networking applications.

Figure 10:
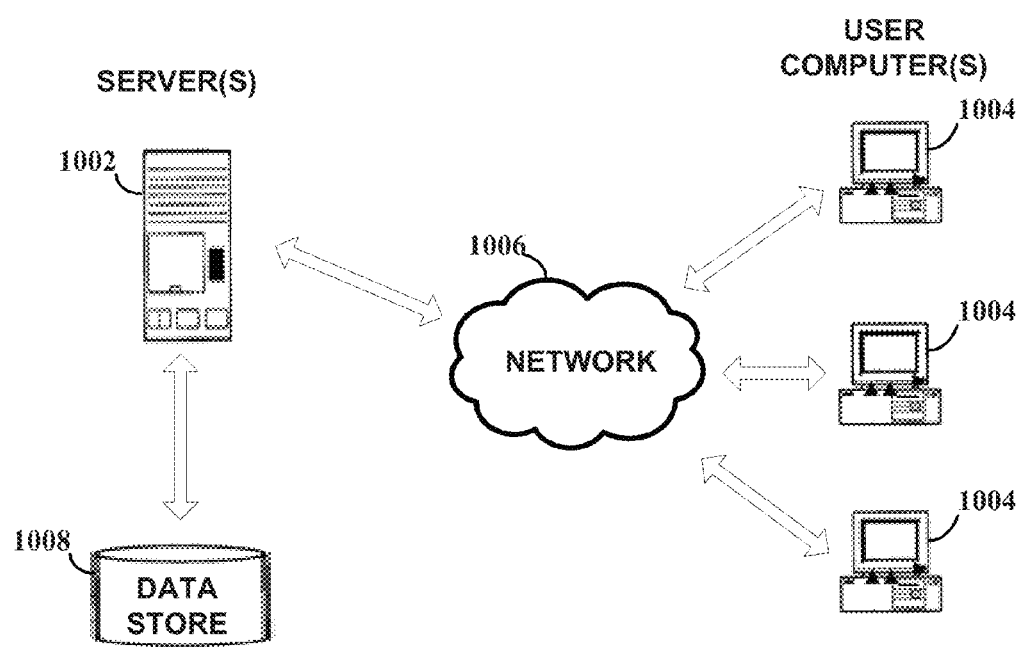
FIG. 10 illustrates some components that can be used in connection with one or more embodiments of the present disclosure.

FIG. 10 illustrates some components that can be used in connection with one or more embodiments of the present disclosure. In accordance with one or more embodiments of the present disclosure, one or more computing devices, e.g., one or more servers, user devices 104 or other computing device, are configured to comprise functionality described herein. For example, a computing device 1002 can be configured to execute program code, instructions, etc. to provide functionality in accordance with one or more embodiments of the present disclosure.

Computing device 1002 can serve content to user computing devices 1004 using a browser application via a network 1006. Data store 1008, which can include data store(s) 112 and/or 212, can be used to store events, items of contents, user views, social network graphs, push and pull sets as well as other sets, program code to configure a server 1002 in accordance with one or more embodiments disclosed herein.

The user computing device 1004, and/or user device 104, can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 1002 and the user computing device 1004 can include one or more processors, memory, a removable media reader, network interface, display and interface, and one or more input devices, e.g., keyboard, keypad, mouse, etc. and input device interface, for example. One skilled in the art will recognize that server 1002 and user computing device 1004 may be configured in many different ways and implemented using many different combinations of hardware, software, or firmware.

In accordance with one or more embodiments, a computing device 1002 can make a user interface available to a user computing device 1004 via the network 1006. The user interface made available to the user computing device 1004 can include content items, or identifiers (e.g., URLs) selected for the user interface in accordance with one or more embodiments of the present invention. In accordance with one or more embodiments, computing device 1002 makes a user interface available to a user computing device 1004 by communicating a definition of the user interface to the user computing device 1004 via the network 1006. The user interface definition can be specified using any of a number of languages, including without limitation a markup language such as Hypertext Markup Language, scripts, applets and the like. The user interface definition can be processed by an application executing on the user computing device 1004, such as a browser application, to output the user interface on a display coupled, e.g., a display directly or indirectly connected, to the user computing device 1004.

In an embodiment the network 1006 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 8. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 11:
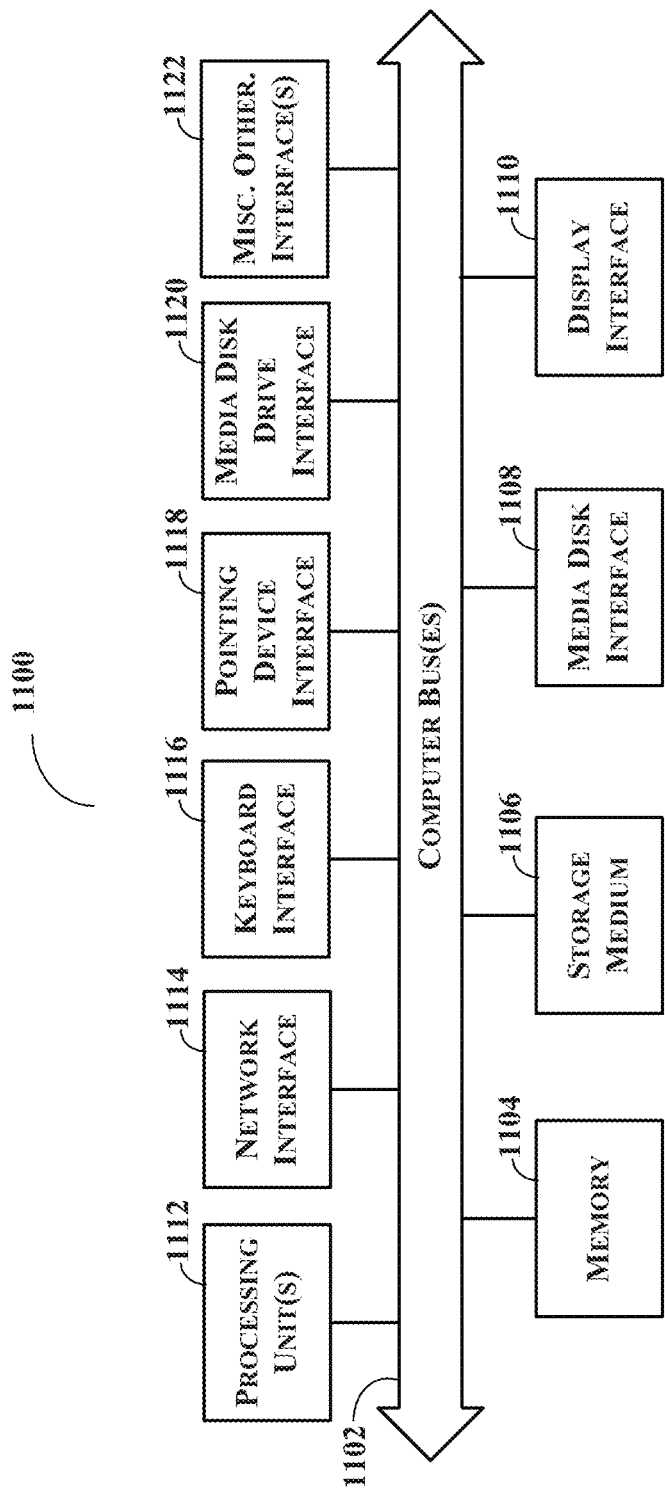
FIG. 11 is a detailed block diagram illustrating an internal architecture of a computing device in accordance with one or more embodiments of the present disclosure.

FIG. 11 is a detailed block diagram illustrating an internal architecture of a computing device, e.g., a computing device such as server 1002 or user computing device 1004, in accordance with one or more embodiments of the present disclosure. As shown in FIG. 11, internal architecture 1100 includes one or more processing units, processors, or processing cores, (also referred to herein as CPUs) 1112, which interface with at least one computer bus 1102. Also interfacing with computer bus 1102 are computer-readable medium, or media, 1106, network interface 1114, memory 1104, e.g., random access memory (RAM), run-time transient memory, read only memory (ROM), etc., media disk drive interface 1120 as an interface for a drive that can read and/or write to media including removable media such as floppy, CD-ROM, DVD, etc. media, display interface 1110 as interface for a monitor or other display device, keyboard interface 1116 as interface for a keyboard, pointing device interface 1118 as an interface for a mouse or other pointing device, and miscellaneous other interfaces not shown individually, such as parallel and serial port interfaces, a universal serial bus (USB) interface, and the like.

Memory 1104 interfaces with computer bus 1102 so as to provide information stored in memory 1104 to CPU 1112 during execution of software programs such as an operating system, application programs, device drivers, and software modules that comprise program code, and/or computer-executable process steps, incorporating functionality described herein, e.g., one or more of process flows described herein. CPU 1112 first loads computer-executable process steps from storage, e.g., memory 1104, computer-readable storage medium/media 1106, removable media drive, and/or other storage device. CPU 1112 can then execute the stored process steps in order to execute the loaded computer-executable process steps. Stored data, e.g., data stored by a storage device, can be accessed by CPU 1112 during the execution of computer-executable process steps.

Persistent storage, e.g., medium/media 1106, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
   obtaining, via at least one computing device, a social graph representing a plurality of social network users as a plurality of content consumers and content producers of the social network, each content producer producing, and each content consumer consuming, one or more items of content, the social graph identifying a content sharing relationship for a consumer-producer pair comprising a content consumer and content producer of the plurality of content consumers and content producers, the content sharing relationship representing that the content consumer consumes the one or more content items produced by the content producer;
   selecting, via the at least one computing device from the plurality of content consumers and content producers, a content sharing hub for at least one consumer producer pair, the content sharing hub having a content sharing relationship with each of the content consumer and the content producer of the consumer-producer pair; and
   defining, via the at least one computing device, a new content sharing relationship for the consumer-producer pair using the content sharing hub, the new content sharing relationship representing that the content consumer consumes the one or more content items produced by the content producer via the content sharing hub;
   wherein there are a plurality of consumer-producer pairs for the plurality of content consumers and content producers, selecting a new content sharing relationship for the consumer-producer pair further comprising:
   determining a plurality of subgraphs of the social graph, each subgraph having as its content sharing hub one of the plurality of content consumers and content producers and comprising one or more consumer-producer pairs of the plurality of consumer-producer pairs and a consumer and producer for each of the one or more consumer-producer pairs;
   determining a cost for each subgraph; and
   repeatedly selecting one of the plurality of subgraphs based on the cost determined for each subgraph until it is determined that each consumer-producer pair of the plurality of consumer-producer pairs is covered by a content sharing hub of a selected subgraph of the plurality of subgraphs, wherein a selected subgraph has the content sharing hub that is used to define the new content sharing relationship.

2. The method of claim 1, the new content sharing relationship for the consumer-producer pair comprising a push strategy to deliver the one or more content items produced by the content producer to the content sharing hub and a pull strategy to deliver the one or more content items produced by the content producer from the content sharing hub to the content consumer.

3. The method of claim 1, selecting a new content sharing relationship for the consumer-producer pair further comprising:
   determining a cost of the content sharing relationship for the consumer-producer pair;
   determining a cost of the new content sharing relationship for the consumer-producer pair; and
   selecting the new content sharing relationship over the content sharing relationship where the cost of the content sharing relationship is greater than the cost of the new content sharing relationship.

4. The method of claim 1, repeatedly selecting one of the plurality of subgraphs based on the cost determined for each subgraph further comprising:
   selecting a subgraph of the plurality of subgraphs, the selected subgraph having a minimum cost relative to the cost of each other subgraph of the plurality of subgraphs;
   removing the selected subgraph from the plurality of subgraphs; specifying a push strategy for each producer in the subgraph that is in a consumer-producer pair with the subgraph's content sharing hub and a pull strategy for each consumer in the subgraph that is in a consumer-producer pair with the subgraph's content sharing hub; and
   repeatedly selecting a subgraph, removing the selected subgraph and specifying the push and pull strategies until it is determined that each consumer producer pair of the plurality is covered.

5. The method of claim 1, determining a cost for each subgraph further comprising:
   determining a number of consumer-producer pairs in the subgraph;
   determining a number of consumers and producers in the subgraph; and
   determining the cost of the subgraph as the number of consumer-producer pairs in the subgraph divided by the number of consumers and producers in the subgraph.

6. The method of claim 1, determining a cost for each subgraph further comprising:
   determining a number of consumer-producer pairs in the subgraph;
   determining a weighted cost sum comprising the content-consuming rate of each consumer and the content-production rate of each producer in the subgraph; and
   determining the cost of the subgraph as the number of consumer-producer pairs in the subgraph divided by the weighted cost sum.

7. The method of claim 1, wherein the social graph represents each content consumer and each content producer of the plurality of content consumers and content producers as a vertex of a plurality of vertices of the social graph, selecting a content sharing hub for at least one consumer-producer pair further comprising:
   selecting a first vertex of the plurality of vertices of the social graph;

selecting a second vertex of the plurality of vertices of the social graph, the social graph indicating that the first vertex is in a consumer-producer pair with the second vertex;

identifying at least one third vertex selected from the plurality of vertices, the social graph indicating that each third vertex is in a consumer-producer pair with the first vertex and is in a consumer-producer pair with the second vertex;

determining a cost of sharing content without using the second vertex as the content sharing hub for the first vertex and the at least one third vertex;

determining a cost of sharing content using the second vertex as the candidate sharing hub for the first vertex and the at least one third vertex; and selecting the third vertex as the content sharing hub for the first vertex and the at least one third vertex where the cost of sharing content without the third vertex as the content sharing hub is greater than the cost of sharing content using the third vertex as the content sharing hub.

8. The method of claim 7, the first vertex represents a content consumer and each third vertex represents one content producer of the plurality of content consumers and content producers, the method further comprising:

using a push strategy for each content producer to deliver the one or more content items produced by the content producer to the content sharing hub and a pull strategy to deliver the one or more content items produced by each content producer from the content sharing hub to the content consumer.

9. The method of claim 7, further comprising:

determining whether there is at least one other content consumer that is in a consumer-producer pair with at least one content producer represented by a third vertex and is in a consumer-producer pair with the content sharing hub; and performing the following where it is determined that there is at least one other content consumer:

determining a cost of sharing content without using the second vertex as the content sharing hub between the at least one other content consumer and the at least one content producer;

determining a cost of sharing content using the second vertex as the candidate sharing hub between the at least one other content consumer and the at least one content producer; and selecting the third vertex as the content sharing hub for sharing content between the at least one other content consumer and the at least one content producer where the cost of sharing content without the third vertex as the content sharing hub is more than the cost of sharing content using the third vertex as the content sharing hub.

10. The method of claim 7, further comprising:

determining that there is at least one consumer-producer pair of the plurality for which a content sharing hub is not selected, and performing the following for each of the at least one consumer-producer pair:

obtaining a content-producing rate at which the content producer produces the one or more items of content;

obtaining a content-consuming rate at which the content consumer consumes one or more items of content; and selecting between a push strategy and a pull strategy for delivering the one or more items of content from the content producer to the content consumer based on the content-consuming rate of the content consumer and the content-producing rate of the content producer, wherein:

with the push strategy, each one of the items of content is delivered from the content producer to the content consumer when the item of content is produced by the content producer; and with the pull strategy, each one of the items of content is delivered from the content producer to the content consumer when the item of content is consumed by the content consumer.

11. A system comprising:

at least one computing device comprising one or more processors coupled to a memory storing computer executable instructions operable to:

obtain a social graph representing a plurality of social network users as a plurality of content consumers and content producers of the social network, each content producer producing, and each content consumer consuming, one or more items of content, the social graph identifying a content sharing relationship for a consumer-producer pair comprising a content consumer and content producer of the plurality of content consumers and content producers, the content sharing relationship representing that the content consumer consumes the one or more content items produced by the content producer;

select, from the plurality of content consumers and content producers, a content sharing hub for at least one consumer-producer pair, the content sharing hub having a content sharing relationship with each of the content consumer and the content producer of the consumer-producer pair; and define a new content sharing relationship for the consumer-producer pair using the content sharing hub, the new content sharing relationship representing that the content consumer consumes the one or more content items produced by the content producer via the content sharing hub;

wherein there are a plurality of consumer-producer pairs for the plurality of content consumers and content producers, the instructions to select a new content sharing relationship for the consumer-producer pair further comprising instructions to:

determine a plurality of subgraphs of the social graph, each subgraph having as its content sharing hub one of the plurality of content consumers and content producers and comprising one or more consumer-producer pairs of the plurality of consumer-producer pairs and a consumer and producer for each of the one or more consumer-producer pairs;

determine a cost for each subgraph; and repeatedly select one of the plurality of subgraphs based on the cost determined for each subgraph until it is determined that each consumer-producer pair of the plurality of consumer-producer pairs is covered by a content sharing hub of a selected subgraph of the plurality of subgraphs, wherein a selected subgraph has the content sharing hub that is used to define the new content sharing relationship.

12. The system of claim 11, the new content sharing relationship for the consumer-producer pair comprising a push strategy to deliver the one or more content items produced by the content producer to the content sharing hub and a pull strategy to deliver the one or more content items produced by the content producer from the content sharing hub to the content consumer.

13. The system of claim 11, the instructions to select a new content sharing relationship for the consumer-producer pair further comprising instructions to:
  determine a cost of the content sharing relationship for the consumer-producer pair;
  determine a cost of the new content sharing relationship for the consumer-producer pair; and
  select the new content sharing relationship over the content sharing relationship where the cost of the content sharing relationship is greater than the cost of the new content sharing relationship.

14. The system of claim 11, the instructions to repeatedly select one of the plurality of subgraphs based on the cost determined for each subgraph further comprising instructions to:
  select a subgraph of the plurality of subgraphs, the selected subgraph having a
    minimum cost relative to the cost of each other subgraph of the plurality of subgraphs;
    remove the selected subgraph from the plurality of subgraphs;
    specify a push strategy for each producer in the subgraph that is in a consumer producer pair with the subgraph's content sharing hub and a pull strategy for each consumer in the subgraph that is in a consumer-producer pair with the subgraph's content sharing hub; and
    repeatedly select a subgraph, remove the selected subgraph and specify the push and pull strategies until it is determined that each consumer-producer pair of the plurality is covered.

15. The system of claim 11, the instructions to determine a cost for each subgraph further comprising instructions to:
  determine a number of consumer-producer pairs in the subgraph;
  determine a number of consumers and producers in the subgraph; and
  determine the cost of the subgraph as the number of consumer-producer pairs in the subgraph divided by the number of consumers and producers in the subgraph.

16. The system of claim 11, the instructions to determine a cost for each subgraph further comprising instructions to:
  determine a number of consumer-producer pairs in the subgraph;
  determine a weighted cost sum comprising the content-consuming rate of each consumer and the content-production rate of each producer in the subgraph; and
  determine the cost of the subgraph as the number of consumer-producer pairs in the subgraph divided by the weighted cost sum.

17. The system of claim 11, wherein the social graph represents each content consumer and each content producer of the plurality of content consumers and content producers as a vertex of a plurality of vertices of the social graph, the instructions to select a content sharing hub for at least one consumer-producer pair further comprising instructions to:
  select a first vertex of the plurality of vertices of the social graph;
  select a second vertex of the plurality of vertices of the social graph, the social graph indicating that the first vertex is in a consumer-producer pair with the second vertex;
  identify at least one third vertex selected from the plurality of vertices, the social graph indicating that each third vertex is in a consumer-producer pair with the first vertex and is in a consumer-producer pair with the second vertex;
  determine a cost of sharing content without using the second vertex as the content sharing hub for the first vertex and the at least one third vertex;
  determine a cost of sharing content using the second vertex as the candidate sharing hub for the first vertex and the at least one third vertex; and
  select the third vertex as the content sharing hub for the first vertex and the at least one third vertex where the cost of sharing content without the third vertex as the content sharing hub is greater than the cost of sharing content using the third vertex as the content sharing hub.

18. The system of claim 17, the first vertex represents a content consumer and each third vertex represents one content producer of the plurality of content consumers and content producers, the instructions further comprising instructions to:
  use a push strategy for each content producer to deliver the one or more content items produced by the content producer to the content sharing hub and a pull strategy to deliver the one or more content items produced by each content producer from the content sharing hub to the content consumer.

19. The system of claim 17, the instructions further comprising instructions to:
  determine whether there is at least one other content consumer that is in a consumer-producer pair with at least one content producer represented by a third vertex and is in a consumer-producer pair with the content sharing hub; and
  perform the following where it is determined that there is at least one other content consumer:
    determine a cost of sharing content without using the second vertex as the content sharing hub between the at least one other content consumer and the at least one content producer;
    determine a cost of sharing content using the second vertex as the candidate sharing hub between the at least one other content consumer and the at least one content producer; and
    select the third vertex as the content sharing hub for sharing content between the at least one other content consumer and the at least one content producer where the cost of sharing content without the third vertex as the content share hub is more than the cost of sharing content using the third vertex as the content sharing hub.

20. The system of claim 17, the instructions further comprising instructions to:
  determine that there is at least one consumer-producer pair of the plurality for which a content sharing hub is not selected, and perform the following for each of the at least one consumer-producer pair:
    obtain a content-producing rate at which the content producer produces the one or more items of content;
    obtain a content-consuming rate at which the content consumer consumes one or more items of content; and
    select between a push strategy and a pull strategy for delivering the one or more items of content from the content producer to the content consumer based on the content-consuming rate of the content consumer and the content-producing rate of the content producer, wherein:
      with the push strategy, each one of the items of content is delivered from the content producer to the content consumer when the item of content is produced by the content producer; and with the pull strategy, each one of the items of content is delivered from the content producer to the content consumer when the item of content is consumed by the content consumer.

21. A non-transitory computer readable storage medium for tangibly storing thereon computer readable instructions that when executed cause at least one processor to:

obtain a social graph representing a plurality of social network users as a plurality of content consumers and content producers of the social network, each content producer producing, and each content consumer consuming, one or more items of content, the social graph identifying a content sharing relationship for a consumer-producer pair comprising a content consumer and content producer of the plurality of content consumers and content producers, the content sharing relationship representing that the content consumer consumes the one or more content items produced by the content producer;

select, from the plurality of content consumers and content producers, a content sharing hub for at least one consumer-producer pair, the content sharing hub having a content sharing relationship with each of the content consumer and the content producer of the consumer-producer pair; and define a new content sharing relationship for the consumer-producer pair using the content sharing hub, the new content sharing relationship representing that the content consumer consumes the one or more content items produced by the content producer via the content sharing hub wherein there are a plurality of consumer-producer pairs for the plurality of content consumers and content producers, the instructions to select a new content sharing relationship for the consumer-producer pair further comprising instructions to:

determine a plurality of subgraphs of the social graph, each subgraph having as its content sharing hub one of the plurality of content consumers and content producers and comprising one or more consumer-producer pairs of the plurality of consumer-producer pairs and a consumer and producer for each of the one or more consumer-producer pairs;

determine a cost for each subgraph; and repeatedly select one of the plurality of subgraphs based on the cost determined for each subgraph until it is determined that each consumer-producer pair of the plurality of consumer-producer pairs is covered by a content sharing hub of a selected subgraph of the plurality of subgraphs, wherein a selected subgraph has the content sharing hub that is used to define the new content sharing relationship.

22. The medium of claim 21, the new content sharing relationship for the consumer-producer pair comprising a push strategy to deliver the one or more content items produced by the content producer to the content sharing hub and a pull strategy to deliver the one or more content items produced by the content producer from the content sharing hub to the content consumer.

23. The medium of claim 21, the instructions to select a new content sharing relationship for the consumer-producer pair further comprising instructions to:

determine a cost of the content sharing relationship for the consumer-producer pair;

determine a cost of the new content sharing relationship for the consumer-producer pair; and select the new content sharing relationship over the content sharing relationship where the cost of the content sharing relationship is greater than the cost of the new content sharing relationship.

24. The medium of claim 21, the instructions to repeatedly select one of the plurality of subgraphs based on the cost determined for each subgraph further comprising instructions to:

select a subgraph of the plurality of subgraphs, the selected subgraph having a minimum cost relative to the cost of each other subgraph of the plurality of subgraphs;

remove the selected subgraph from the plurality of subgraphs;

specify a push strategy for each producer in the subgraph that is in a consumer producer pair with the subgraph's content sharing hub and a pull strategy for each consumer in the subgraph that is in a consumer-producer pair with the subgraph's content sharing hub; and repeatedly select a subgraph, remove the selected subgraph and specify the push and pull strategies until it is determined that each consumer-producer pair of the plurality is covered.

25. The medium of claim 21, the instructions to determine a cost for each subgraph further comprising instructions to:

determine a number of consumer-producer pairs in the subgraph;

determine a number of consumers and producers in the subgraph; and determine the cost of the subgraph as the number of consumer-producer pairs in the subgraph divided by the number of consumers and producers in the subgraph.

26. The medium of claim 21, the instructions to determine a cost for each subgraph further comprising instructions to:

determine a number of consumer-producer pairs in the subgraph;

determine a weighted cost sum comprising the content-consuming rate of each consumer and the content-production rate of each producer in the subgraph; and determine the cost of the subgraph as the number of consumer-producer pairs in the subgraph divided by the weighted cost sum.

27. The medium of claim 21, wherein the social graph represents each content consumer and each content producer of the plurality of content consumers and content producers as a vertex of a plurality of vertices of the social graph, the instructions to select a content sharing hub for at least one consumer-producer pair further comprising instructions to:

select a first vertex of the plurality of vertices of the social graph;

select a second vertex of the plurality of vertices of the social graph, the social graph indicating that the first vertex is in a consumer-producer pair with the second vertex;

identify at least one third vertex selected from the plurality of vertices, the social graph indicating that each third vertex is in a consumer-producer pair with the first vertex and is in a consumer-producer pair with the second vertex;

determine a cost of sharing content without using the second vertex as the content sharing hub for the first vertex and the at least one third vertex;

determine a cost of sharing content using the second vertex as the candidate sharing hub for the first vertex and the at least one third vertex; and select the third vertex as the content sharing hub for the first vertex and the at least one third vertex where the cost of sharing content without the third vertex as the content sharing hub is greater than the cost of sharing content using the third vertex as the content sharing hub.

28. The medium of claim 27, the first vertex represents a content consumer and each third vertex represents one content producer of the plurality of content consumers and content producers, the instructions further comprising instructions to:
   use a push strategy for each content producer to deliver the one or more content items produced by the content producer to the content sharing hub and a pull strategy to deliver the one or more content items produced by each content producer from the content sharing hub to the content consumer.

29. The medium of claim 27, the instructions further comprising instructions to:
   determine whether there is at least one other content consumer that is in a consumer-producer pair with at least one content producer represented by a third vertex and is in a consumer-producer pair with the content sharing hub; and
   perform the following where it is determined that there is at least one other content consumer:
      determine a cost of sharing content without using the second vertex as the content sharing hub between the at least one other content consumer and the at least one content producer;
      determine a cost of sharing content using the second vertex as the candidate sharing hub between the at least one other content consumer and the at least one content producer; and
      select the third vertex as the content sharing hub for sharing content between the at least one other content consumer and the at least one content producer where the cost of sharing content without the third vertex as the content share hub is more than the cost of sharing content using the third vertex as the content sharing hub.

30. The medium of claim 27, the instructions further comprising instructions to:
   determine that there is at least one consumer-producer pair of the plurality for which a content sharing hub is not selected, and perform the following for each of the at least one consumer-producer pair:
      obtain a content-producing rate at which the content producer produces the one or more items of content;
      obtain a content-consuming rate at which the content consumer consumes one or more items of content; and
      select between a push strategy and a pull strategy for delivering the one or more items of content from the content producer to the content consumer based on the content-consuming rate of the content consumer and the content-producing rate of the content producer, wherein:
         with the push strategy, each one of the items of content is delivered from the content producer to the content consumer when the item of content is produced by the content producer; and
         with the pull strategy, each one of the items of content is delivered from the content producer to the content consumer when the item of content is consumed by the content consumer.

* * * * *